(12) United States Patent
Ausen et al.

(10) Patent No.: US 10,099,408 B2
(45) Date of Patent: Oct. 16, 2018

(54) POLYMERIC LAYERS AND METHODS OF MAKING THE SAME

(71) Applicant: 3M INNOVATIVE PROPERTIES COMPANY, St. Paul, MN (US)

(72) Inventors: Ronald W. Ausen, St. Paul, MN (US); Ronald R. Borst, Hastings, MN (US); Thomas P. Hanschen, Mendota Heights, MN (US); William J. Kopecky, Hudson, WI (US); Michelle L. Legatt, St. Paul, MN (US); Wei Zhang, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 182 days.

(21) Appl. No.: 14/900,343

(22) PCT Filed: Jun. 16, 2014

(86) PCT No.: PCT/US2014/042487
§ 371 (c)(1),
(2) Date: Dec. 21, 2015

(87) PCT Pub. No.: WO2014/209651
PCT Pub. Date: Dec. 31, 2014

(65) Prior Publication Data
US 2016/0144539 A1    May 26, 2016

Related U.S. Application Data

(60) Provisional application No. 61/840,148, filed on Jun. 27, 2013.

(51) Int. Cl.
*B29D 7/01* (2006.01)
*B29C 43/22* (2006.01)
(Continued)

(52) U.S. Cl.
CPC ............ *B29C 43/222* (2013.01); *B29C 43/24* (2013.01); *B29C 43/28* (2013.01); *B29C 47/003* (2013.01);
(Continued)

(58) Field of Classification Search
CPC .................................................... B29C 43/222
See application file for complete search history.

(56) References Cited

U.S. PATENT DOCUMENTS 3,054,148 A    9/1962    Zimmerli
3,302,501 A    2/1967    Greene
(Continued)

FOREIGN PATENT DOCUMENTS

GB    2262906    7/1993
JP    48-086396    11/1973
(Continued)

OTHER PUBLICATIONS

Satpathy, "Is compression bandaging accurate? The routine use of interface pressure measurements in compression bandaging of venous leg ulcers", Phlebology, 2006, vol. 21, No. 1, pp. 36-40.
(Continued)

*Primary Examiner* — Galen H Hauth
(74) *Attorney, Agent, or Firm* — Gregory D. Allen

(57) ABSTRACT

Polymeric layers (50) comprising an array of blind openings (56) extending into the first major surface (52, 10111, 11211), but not through the second major surfaces (54, 10112, 11212). The blind openings each have a series of areas through the openings from the first major surface towards the second major surfaces ranging from minimum to maximum areas, where for at least a majority of the blind openings the minimum area is not at the first major surface. At least a portion of the first major surface comprises a first material and extends up to, but not into the second major
(Continued)

surface. At least a portion of the second major surface comprises a second, different material. Methods for making the polymeric layers are also disclosed. Polymeric layers are useful, for example, as components in personal care garments such as diapers and feminine hygiene products. They can also be useful for filtering (including liquid filtering) and acoustic applications.

5 Claims, 19 Drawing Sheets

(51) Int. Cl.
  B29D 28/00 (2006.01)
  B29C 47/00 (2006.01)
  B32B 38/00 (2006.01)
  D01D 5/30 (2006.01)
  B29C 47/88 (2006.01)
  B29C 43/24 (2006.01)
  B29C 43/28 (2006.01)
  B32B 3/26 (2006.01)
  B29C 47/06 (2006.01)
  B32B 37/14 (2006.01)
  B32B 38/04 (2006.01)
  B29C 47/14 (2006.01)
  B29K 101/12 (2006.01)
  B29K 105/00 (2006.01)
  B29L 9/00 (2006.01)

(52) U.S. Cl.
  CPC ...... B29C 47/0014 (2013.01); B29C 47/0021 (2013.01); B29C 47/0033 (2013.01); B29C 47/887 (2013.01); B29C 47/8845 (2013.01); B29D 7/01 (2013.01); B29D 28/00 (2013.01); B32B 3/266 (2013.01); B32B 38/0032 (2013.01); D01D 5/30 (2013.01); B29C 47/004 (2013.01); B29C 47/065 (2013.01); B29C 47/145 (2013.01); B29K 2101/12 (2013.01); B29K 2105/253 (2013.01); B29K 2995/0001 (2013.01); B29K 2995/0065 (2013.01); B29K 2995/0068 (2013.01); B29L 2009/00 (2013.01); B32B 37/144 (2013.01); B32B 2038/047 (2013.01)

(56) References Cited

U.S. PATENT DOCUMENTS

| | | |
|---|---|---|
| 3,394,211 A | 7/1968 | MacDuff |
| 3,471,588 A | 10/1969 | Kanner |
| 3,471,597 A | 10/1969 | Schirmer |
| 3,781,183 A * | 12/1973 | Doll ............... B29C 51/004 156/250 |
| 3,831,741 A | 8/1974 | Poupitch |
| 3,895,983 A * | 7/1975 | Lang ............... B29C 67/20 156/220 |
| 4,472,328 A | 9/1984 | Sugimoto |
| 4,933,081 A | 6/1990 | Sasaki |
| 4,995,930 A | 2/1991 | Merz |
| 5,614,310 A | 3/1997 | Delgado |
| 5,718,972 A * | 2/1998 | Murase ............. D04H 1/54 156/167 |
| 5,948,517 A | 9/1999 | Adamko |
| 6,228,449 B1 | 5/2001 | Meyer |
| 6,240,817 B1 | 6/2001 | James |
| 6,348,249 B2 | 2/2002 | Meyer |
| 6,465,107 B1 | 10/2002 | Kelly |
| 6,986,938 B2 | 1/2006 | Zink |
| 8,758,882 B2 | 6/2014 | Ausen |
| 2008/0202075 A1 | 8/2008 | Kronawittleithner |
| 2013/0009336 A1 | 1/2013 | Ausen |
| 2014/0220328 A1 | 8/2014 | Ausen |
| 2014/0234606 A1 | 8/2014 | Ausen |
| 2016/0002838 A1 | 1/2016 | Ausen |

FOREIGN PATENT DOCUMENTS

| | | |
|---|---|---|
| WO | WO 1996/14038 | 5/1996 |
| WO | WO 96/19173 | 6/1996 |
| WO | WO 1996/39349 | 12/1996 |
| WO | WO 2011/119325 | 9/2011 |
| WO | WO 2011/119326 | 9/2011 |
| WO | WO 2011/119327 | 9/2011 |
| WO | WO 2013/028654 | 2/2013 |
| WO | WO 2013/052371 | 4/2013 |
| WO | WO 2013/148128 | 10/2013 |
| WO | WO 2015/002730 | 1/2015 |
| WO | WO 2015/050598 | 4/2015 |

OTHER PUBLICATIONS

Thomas, "Compression bandaging in the treatment of venous leg ulcers", World Wide Wounds, Sep. 1997, 14 pages.
International Search Report for PCT International Application No. PCT/US2014/042487, dated Sep. 30, 2014, 4 pages.

* cited by examiner

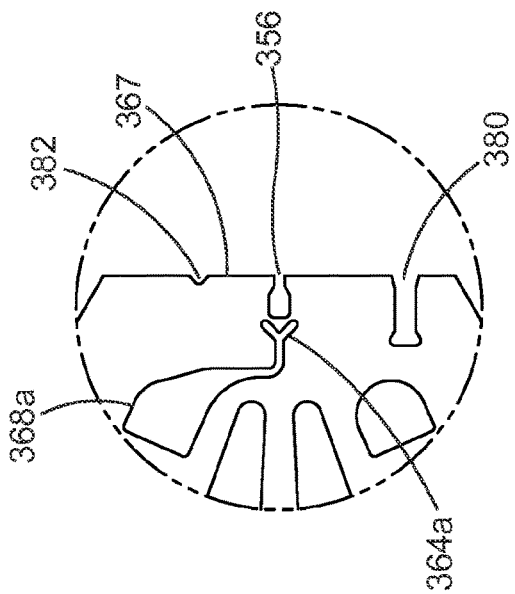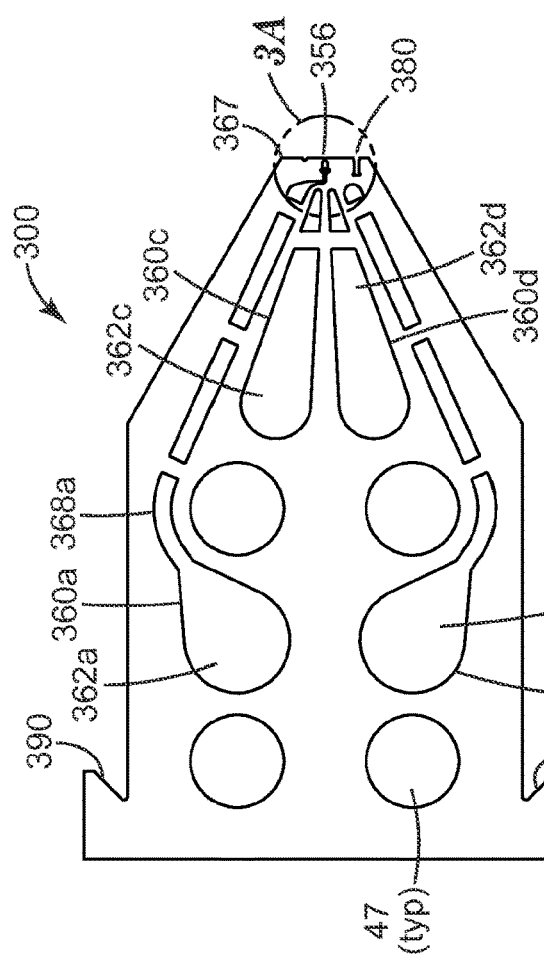

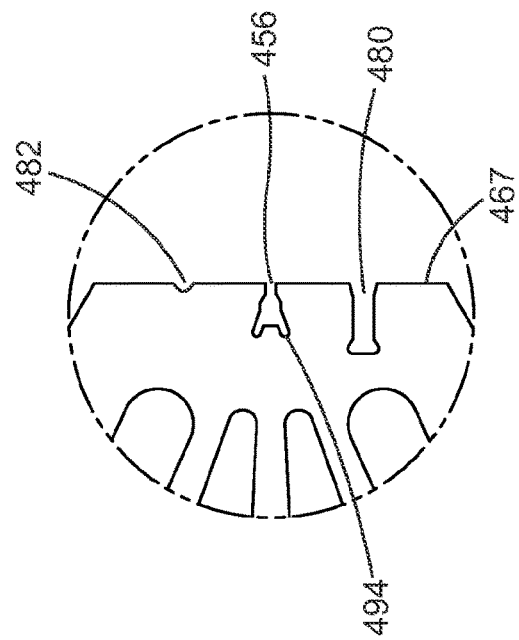
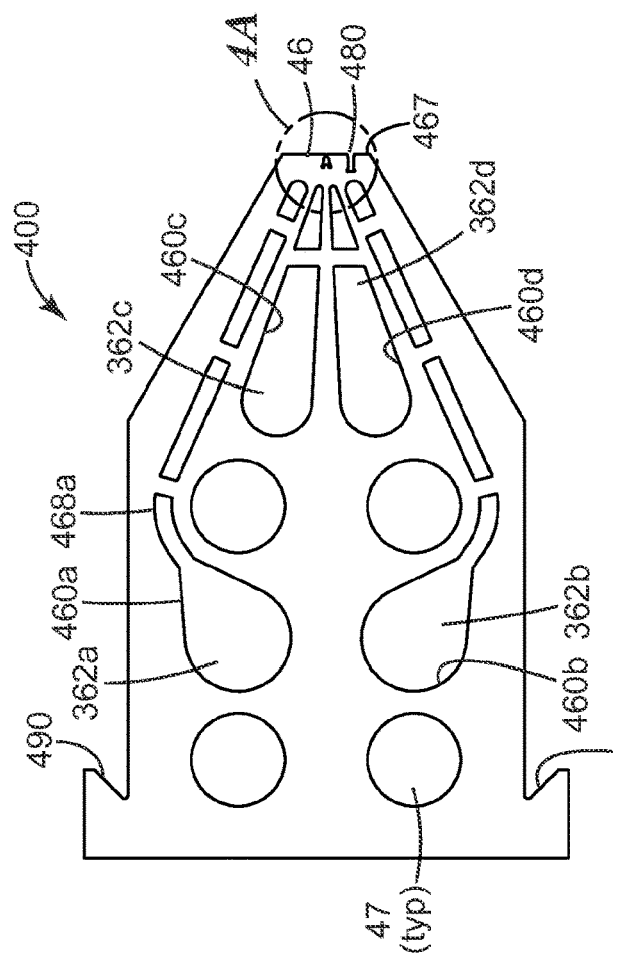

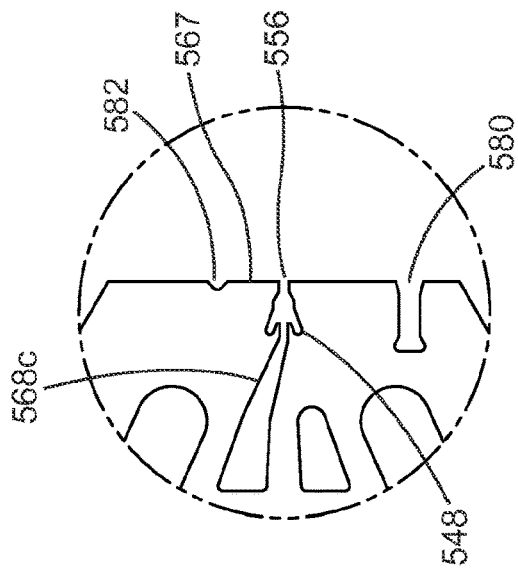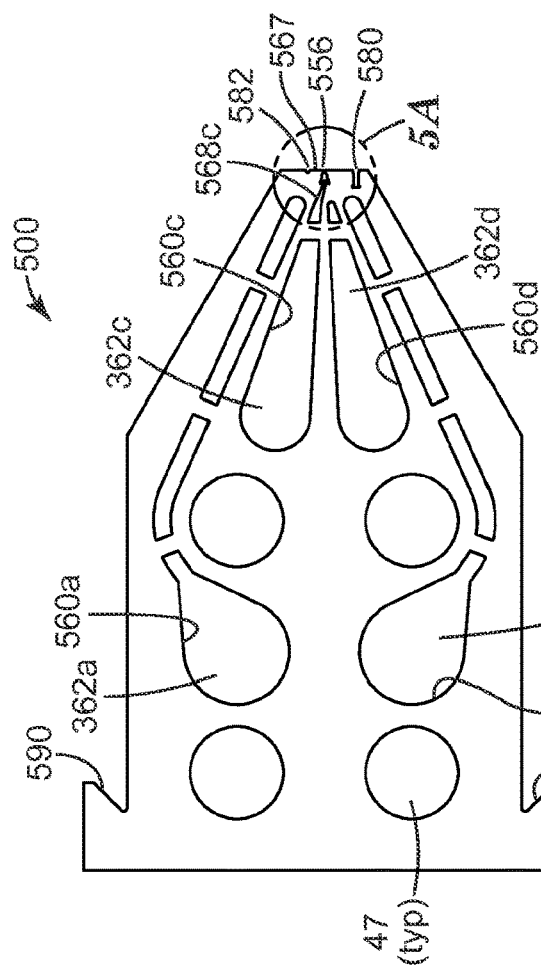

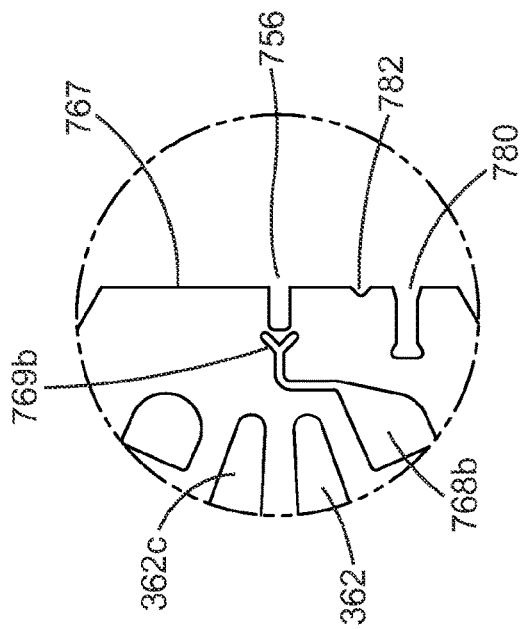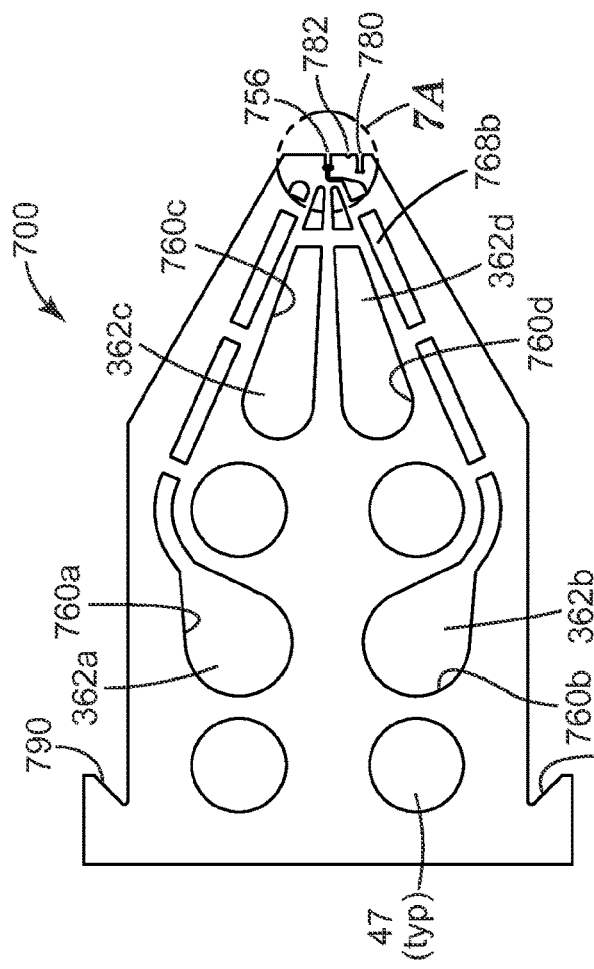

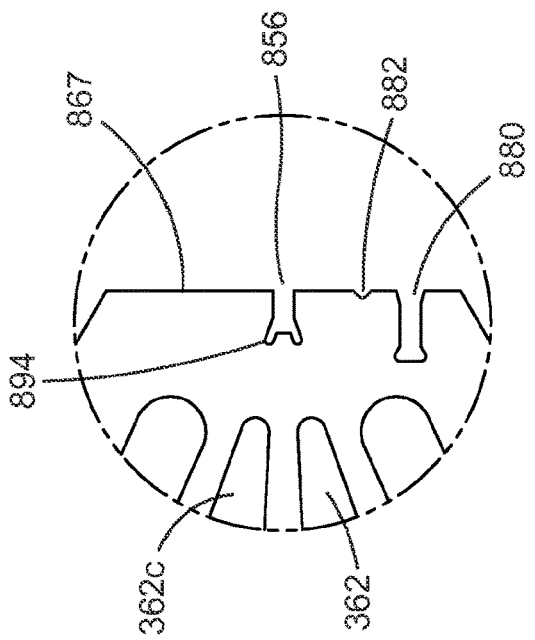
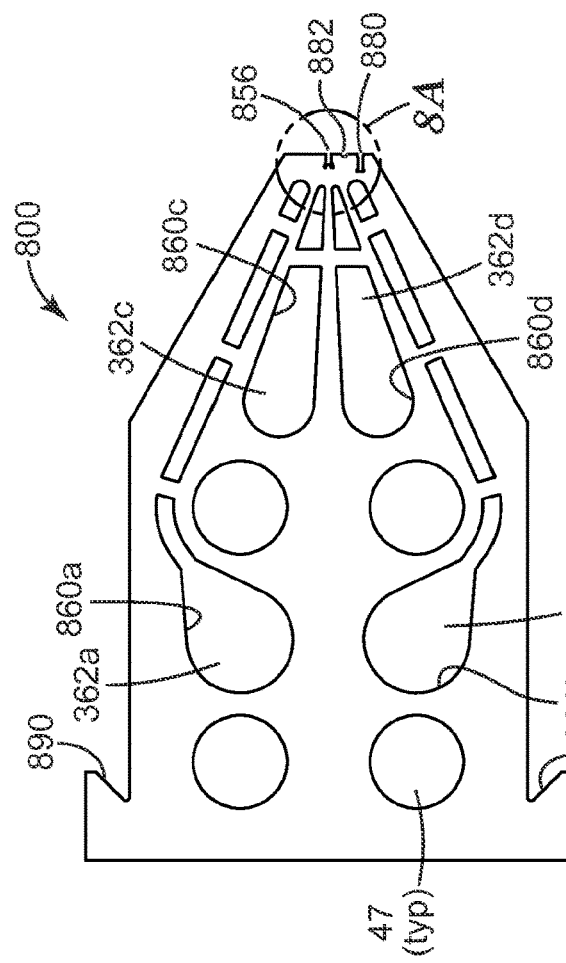

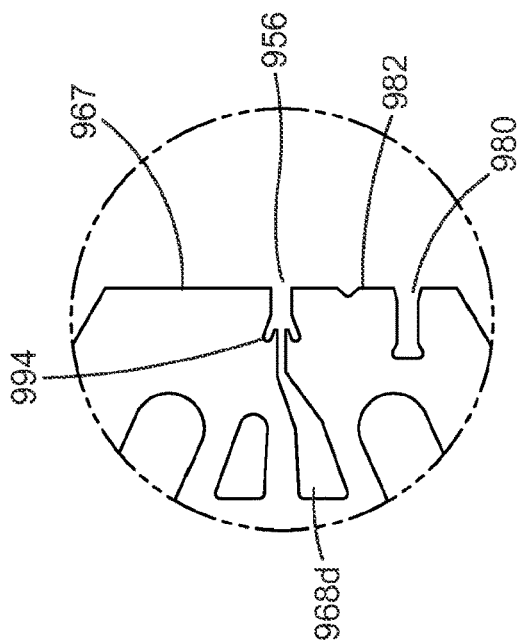
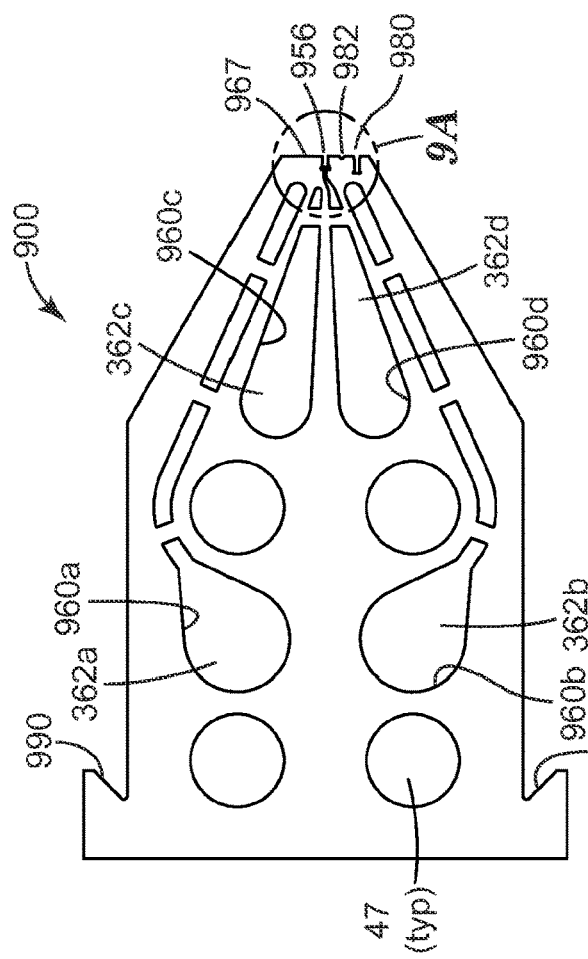

POLYMERIC LAYERS AND METHODS OF MAKING THE SAME

CROSS REFERENCE TO RELATED APPLICATIONS

This application is a national stage filing under 35 U.S.C. 371 of PCT/US2014/042487, filed Jun. 16, 2014, which claims priority to U.S. Provisional Application No. 61/840148, filed Jun. 27, 2013, the disclosure of which is incorporated by reference in its/their entirety herein.

BACKGROUND

Macroporous, perforated films are commonly used for vapor and liquid permeable applications, whereas microporous perforated films are useful for vapor permeable applications, but not liquid permeable applications. Macroporous perforated films are commonly used as components in personal care garments (e.g., diapers and feminine hygiene products). Perforated films are also used in filtering, and acoustic applications.

Macroporous permeable films are commonly made by first producing a continuous film and then subjecting the film to a perforation process. Mechanical perforating devices include intermeshing rollers, die punching, or needlepunching. Films can also be perforated using perforated rollers having thermal zones or lasers that melt perforations into the film. Other techniques for providing the perforations include casting a film on to a porous quench roll that has vacuum on the holes to pull the melt into the hole and produce an aperture, using electrical corona treatment to create perforations by localized energy treatment, and creating perforations is by blending immiscible materials followed by film stretching to create perforations by generation of film voids. It is also known that after quenching polypropylene in to beta phase crystals, upon orientation, the film will become porous.

There exists a need for additional techniques, preferably relatively simple and economical, to make composite layers (including films and sheets) that possess blind holes that penetrate through some, but not all, of the layers.

SUMMARY

In one aspect, the present disclosure describes a polymeric layer having first and second, generally opposed major surfaces, comprising an array of blind openings extending into the first major surface, but not through the second major surfaces, wherein the blind openings each have a series of areas through the blind openings from the first major surface towards the second major surfaces ranging from minimum to maximum areas, wherein for at least a majority of the blind openings the minimum area is not at the first major surface, wherein at least a portion of the first major surface comprises a first material and extends up to, but not into the second major surface, and wherein at least a portion of the second major surface comprises a second, different material.

The term "different" in terms of polymeric materials means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index.

The term "same" in terms of polymeric materials means not different.

In another aspect, the present disclosure provides a method of making embodiments of polymeric layers described herein, the method comprising at least one of passing through a nip or calendaring netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands.

In another aspect, the present disclosure provides a method of making embodiments of polymeric layers described herein, the method comprising at least one of passing through a nip or calendaring a netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein there is a fifth material disposed between the first and second materials, wherein there is a sixth material disposed between the third and fourth materials, wherein the first and fifth materials are different, wherein the first, second, third, and fourth are the same, and wherein the first material does not extend to the second major surface of the first plurality of strands.

Polymeric layers described herein are useful, for example, as components in personal care garments such as diapers and feminine hygiene products. Some embodiments of polymeric layers described herein are useful for applications where a continuous microporous layer and a flexible backing is desired (e.g., medical and packaging tapes).

BRIEF DESCRIPTION OF THE DRAWINGS

FIG. 3 is a plan view of an exemplary shim suited to form a repeating sequence of shims capable of forming a netting having optionally two different types of strands where at least one strand has optionally two different materials in a three layered arrangement;

FIG. 3A is a detail view of the section referenced as "detail 3A" in FIG. 3;

FIG. 4 is a plan view of another exemplary shim suited to form a repeating sequence of shims capable of forming a netting having two different types of strands each of optionally two different materials in a three layered arrangement;

FIG. 4A is a detail view of the section referenced as "detail 4A" in FIG. 4;

FIG. 5 is a plan view of another exemplary shim suited to form a repeating sequence of shims capable of forming a netting having two different types of strands each of optionally two different materials in a three layered arrangement;

FIG. 5A is a detail view of the section referenced as "detail 5A" in FIG. 5;

FIG. 7 is a plan view of another exemplary shim suited to form a repeating sequence of shims capable of forming a netting having two different types of strands each of optionally two different materials in a three layered arrangement;

FIG. 7A is a detail view of the section referenced as "detail 7A" in FIG. 7;

FIG. 8 is a plan view of another exemplary shim suited to form a repeating sequence of shims capable of forming a netting having two different types of strands each of optionally two different materials in a three layered arrangement;

FIG. 8A is a detail view of the section referenced as "detail 8A" in FIG. 8;

FIG. 9 is a plan view of another exemplary shim suited to form a repeating sequence of shims capable of forming a netting having two different types of strands each of optionally two different materials in a three layered arrangement;

FIG. 9A is a detail view of the section referenced as "detail 9A" in FIG. 9;

DETAILED DESCRIPTION

Polymeric layers described herein can be made, for example, from co-extruded netting.

Figure 1:
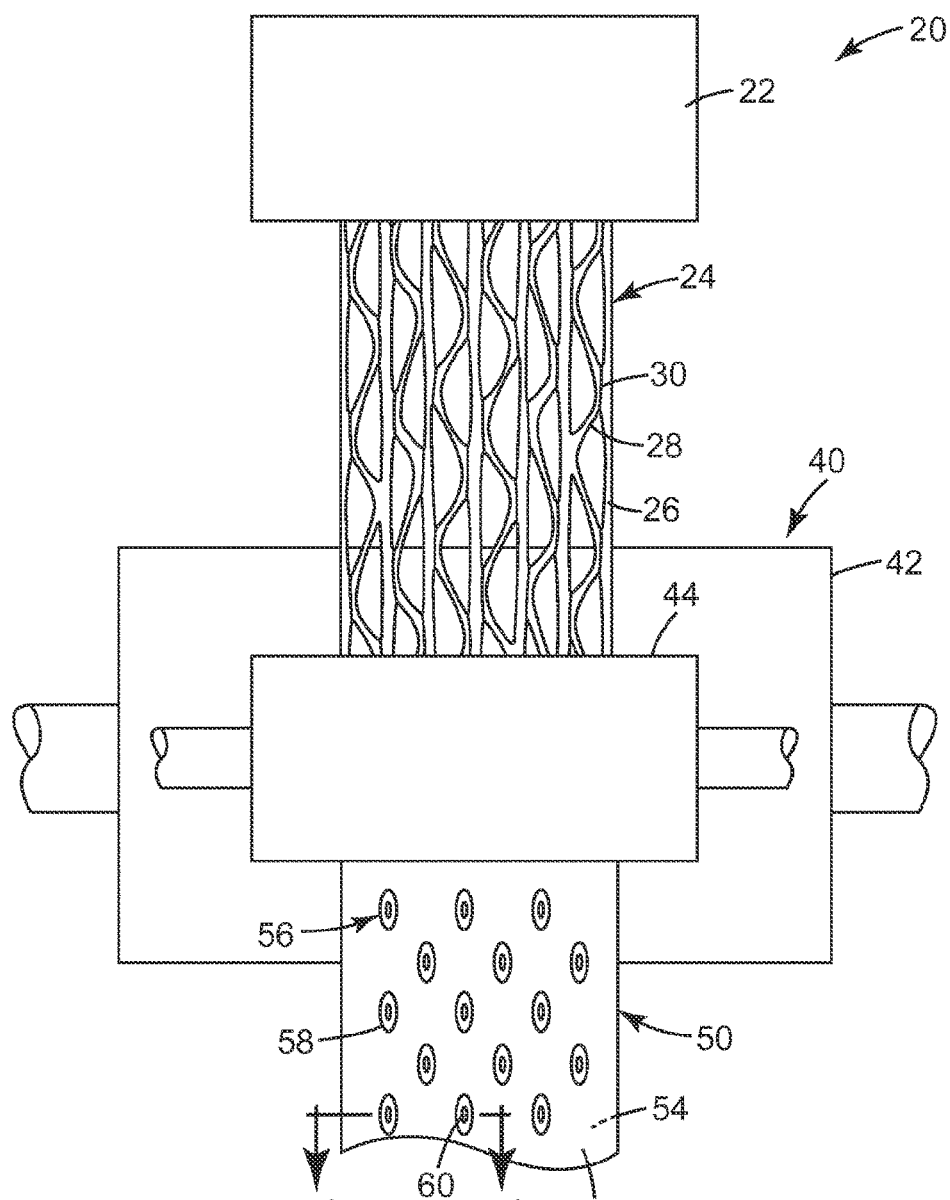
FIG. 1 is a schematic view of an apparatus for making forming polymeric layers having openings therein as described herein.

Referring to FIG. 1, exemplary apparatus 20 for making a polymeric layer having blind openings therein is shown. Apparatus 20 has extruder 22 extruding polymeric netting 24 formed from first polymeric strands 26 and second polymeric strands 28 joined together at bond regions 30. Useful polymeric netting is described, for example, in co-pending application having U.S. Ser. No. 61/779,997, filed Mar. 13, 2013, the disclosure of which is incorporated herein by reference. As will be illustrated in FIG. 1A below, netting for making polymeric layers described herein includes strands that have at least two layers.

As shown, polymeric netting 24 is extruded vertically, into nip 40. Nip 40 includes backup roll 42, and nip roll 44. In some embodiments, backup roll 42 is a smooth, chrome-plated steel roll and nip roll 44 is a silicone rubber roll. In some embodiments, both backup roll 42 and nip roll 44 are temperature controlled with, for example, internal liquid (e.g., water) flow.

In some embodiments, for example, the one depicted in FIG. 1, polymeric netting 24 passes directly into nip 40, where nip 40 is a quench nip. However, this is not considered necessary, and the extrusion of the netting and the entry into the nip need not be immediately sequential.

After passing through nip 40, polymeric netting 24 has been transformed into polymeric layer 50 having blind openings 56 therein. In some embodiments, it may be advantageous to allow polymeric layer 50 to remain wrapped around backup roll 42 for at least a portion of its circumference. Polymeric layer 50 has first major surface 52 on the side towards the viewer, and second major surface 54 on the side opposite from the viewer. In some embodiments, blind openings 56 have well-formed, smooth edges 58. Further, in some embodiments, blind openings 56 taper inwards from both first major surface 52 toward second major surface 54 so that blind opening 56 has a minimum area 60 somewhere in the interior of polymeric layer 50.

Figure 1A:
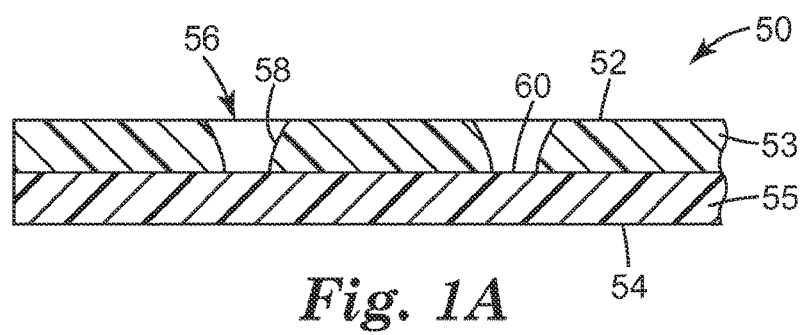
FIG. 1A is a cross-section view of the forming polymeric layer having blind openings therein as described herein taken along section lines 1A-1A in FIG. 1.

These features of blind openings 56 can be better appreciated in FIG. 1A, which is a cross-section view of polymeric layer 50 taken along section lines 1A-1A in FIG. 1. Here it can be seen that blind openings 56 have well-formed, smooth edges 58. Blind openings 56 taper inwards from both first major surface 52 toward second major surface 54. In the illustrated embodiment, first major surface 52 is the exposed portion of first polymer layer 53, and second major surface 54 is the exposed portion of second polymer layer 55. The point where blind opening 56 tapers down to minimum area 60 is shown to be in the interior of polymeric layer 50. The point of minimum area may be, but need not be, near the interface between first polymer layer 53 and second polymer layer 55. In some embodiments, individual blind openings 56 range from 0.005 mm² to 5 mm², although other sizes are also useful. For at least a majority of blind openings 56, the minimum area is not at major surface 52.

Referring to FIG. 1A, polymeric layer 50 has first and second, generally opposed major surfaces, 52, 54 comprising array of blind openings 56 extending from first major surface 52 toward second major surface 52. Blind openings 56 each have a series of areas through the blind openings from first major surface 52 toward second major surface 54 ranging from minimum to maximum areas, wherein there is a total area and a total open area for each of first and second major surfaces 52, 54, wherein the total open area for first major surface 52 is not greater than 50 (in some embodiments, not greater than 45, 40, 35, 30, 25, 20, 15, 10, 5, 4, 3, 2, 1, 0.75, 0.5, 0.25, or even not greater than 0.1; in some embodiments, in a range from 0.1 to not greater than 50, 0.1 to not greater than 45, 0.1 to not greater than 40, 0.1 to not greater than 35, 0.1 to not greater than 30, 0.1 to not greater than 25, 0.1 to not greater than 20, 0.1 to not greater than 15, 0.1 to not greater than 10, or even 0.1 to not greater than 5) percent of the total area of first major surface 52, wherein for at least a majority of blind openings 56, the minimum area is not at first major surface 52, wherein at least a portion of major surface 52 comprises first material 53 and extends up to, but not into second major surface 54, and wherein at least a portion of second major surface 54 comprises second, different material 55.

Figure 2:
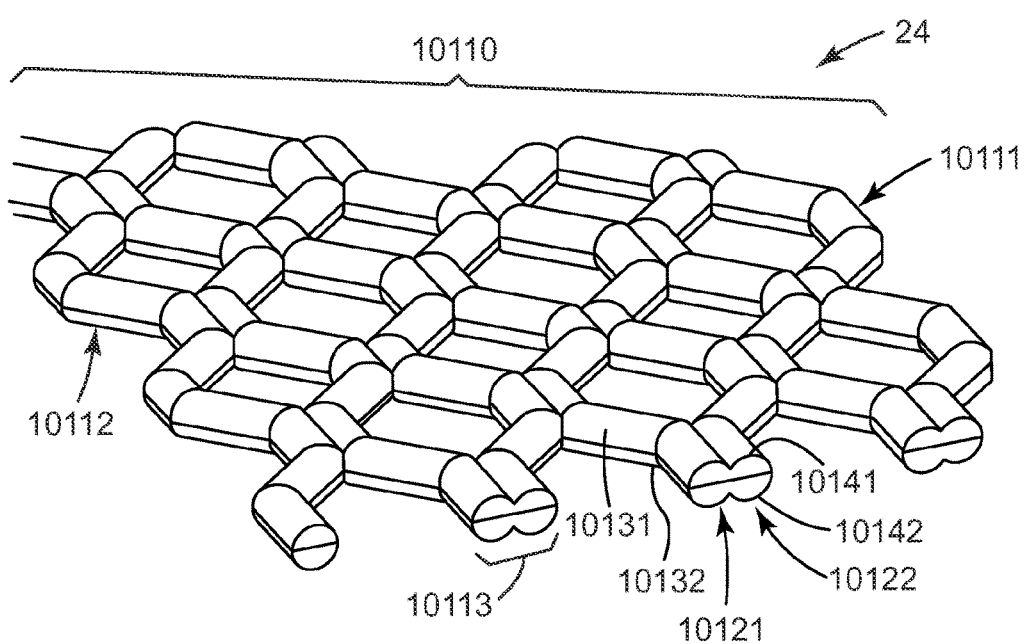
FIG. 2 is a perspective view of the netting in FIG. 1.

Referring to FIG. 2, exemplary first netting 24 for making polymeric layers described herein has array of polymeric strands 10110 periodically joined together at bond regions 10113 throughout array 10110. Netting 24 has first and second, generally opposed major surfaces 10111, 10112. Bond regions 10113 are generally perpendicular to first and second major surfaces 10111, 10112. Array 10110 has first plurality of strands 10121 having first and second, generally opposed major surfaces 10131, 10132. Array 10110 has second plurality of strands 10122 having first and second, generally opposed major surfaces 10141, 10142. First major surface 10111 comprises first major surfaces 10131, 10141 of first and second plurality of strands 10121, 10122. Second major surface 10112 comprises second major surfaces 10132, 10142 of first and second plurality of strands 10121, 10122. First major surface 10131 of first plurality of strands 10121 comprises a first material. Second major surface 10132 of first plurality of strands 10121 comprises a second material. First major surface 10141 of second plurality of strands 10122 comprises a third material. Second major surface 10142 of second plurality of strands 10122 comprises a fourth material. The first and second materials are different, and the first material does not extend to second major surface 10132 of first plurality of strands 10121. Optionally, the third material does not extend to second major surface 10142 of second plurality of strands 10122.

Figure 11:
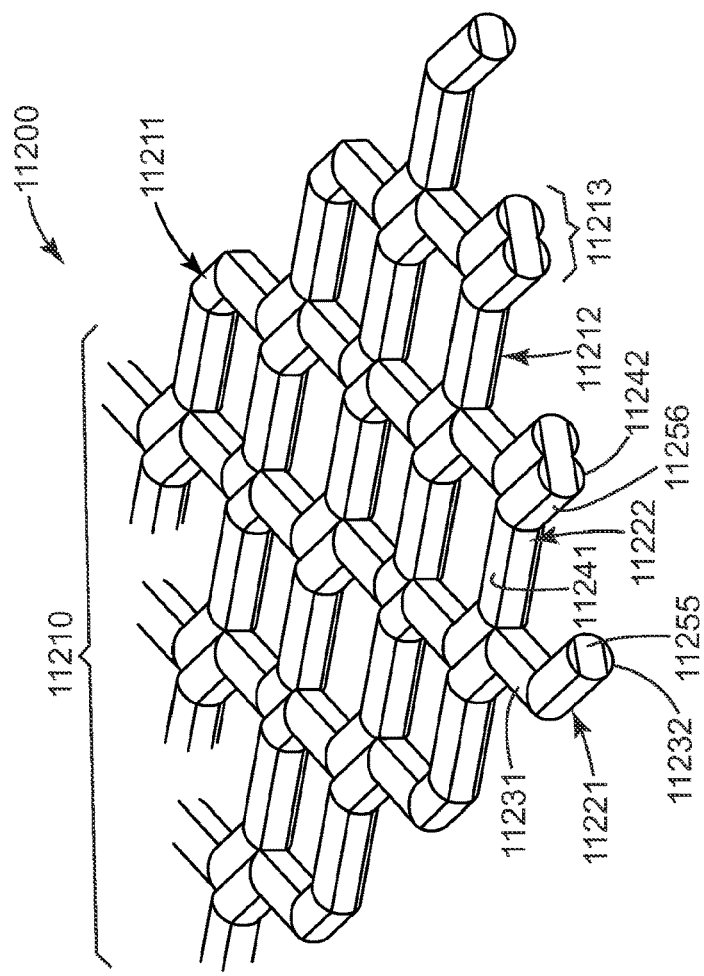
FIG. 11 is a perspective view of an exemplary second netting for making polymeric layers described herein.

Referring to FIG. 11, exemplary second netting 11200 which can be substituted, for example, for netting 24 has array of polymeric strands 11210 periodically joined together at bond regions 11213 throughout array 11210. Netting 11200 has first and second, generally opposed major surfaces 11211, 11212. Bond regions 11213 are generally perpendicular to first and second major surfaces 11211, 11212. Array 11210 has first plurality of strands 11221 having first and second, generally opposed major surfaces 11231, 11232. Array 11210 has second plurality of strands 11222 having first and second, generally opposed major surfaces 11241, 11242. First major surface 11211 comprises first major surfaces 11231, 11241 of first and second plurality of strands 11221, 11222. Second major surface 11212 comprises second major surfaces 11232, 11242 of first and second plurality of strands 11221, 11222. First major surface 11231 of first plurality of strands 11221 comprises a first material. Second major surface 11232 of first plurality of strands 11221 comprises a second material. First major surface 11241 of second plurality of strands 11222 comprises a third material. Second major surface 11242 of second plurality of strands 11222 comprises a fourth material. A fifth material 11255 is disposed between the first and second materials. A sixth material 11256 is disposed between the third and fourth materials. The first and fifth materials are different, the first, second, third, and fourth are the same, and the first material does not extend to second major surface 11232 of first plurality of strands 11221. Optionally, the third material does not extend to second major surface 11242 of second plurality of strands 11222.

Figure 19A:
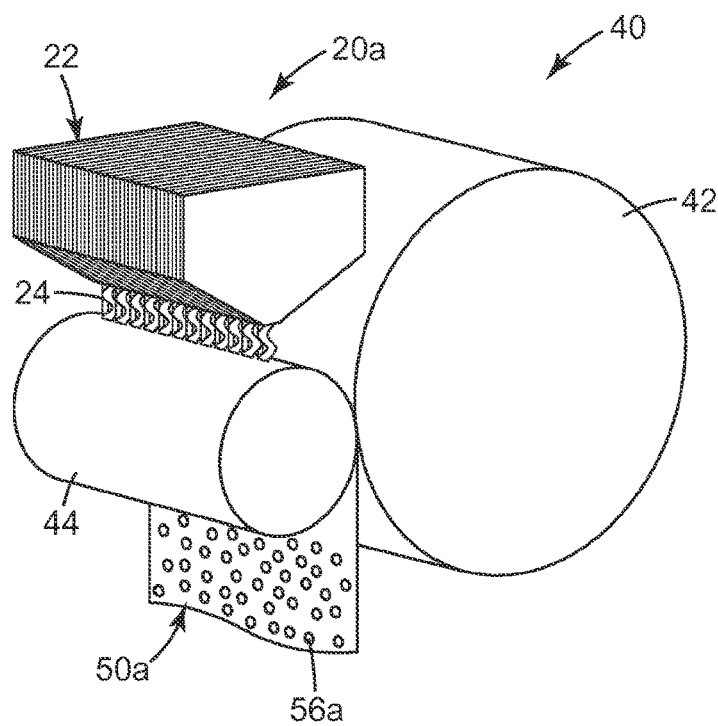
FIG. 19A is a schematic perspective view of an alternate arrangement of the extrusion die relative to the nip.

Referring now to FIG. 19A, a schematic perspective view of another exemplary apparatus 20a with a different arrangement of extrusion die 22 relative to nip 40 is shown. In alternate apparatus 20a, extrusion die 22 is positioned so that polymeric netting 24 is dispensed onto nip roller 44 and carried on that roller into nip between nip roller 44 and backup roller 42. By positioning extrusion die 22 quite close to nip roller 44, there is little time for the strands that make up polymeric netting 24 to sag and extend under the force of gravity. An advantage provided by this positioning is that openings 56a in polymeric layer 50a tend to be rounder. More in this regard can be achieved by extruding not only very close to one of the rolls forming nip 40, but also at an extrusion speed similar to the circumferential speed of that roll.

Figure 19B:
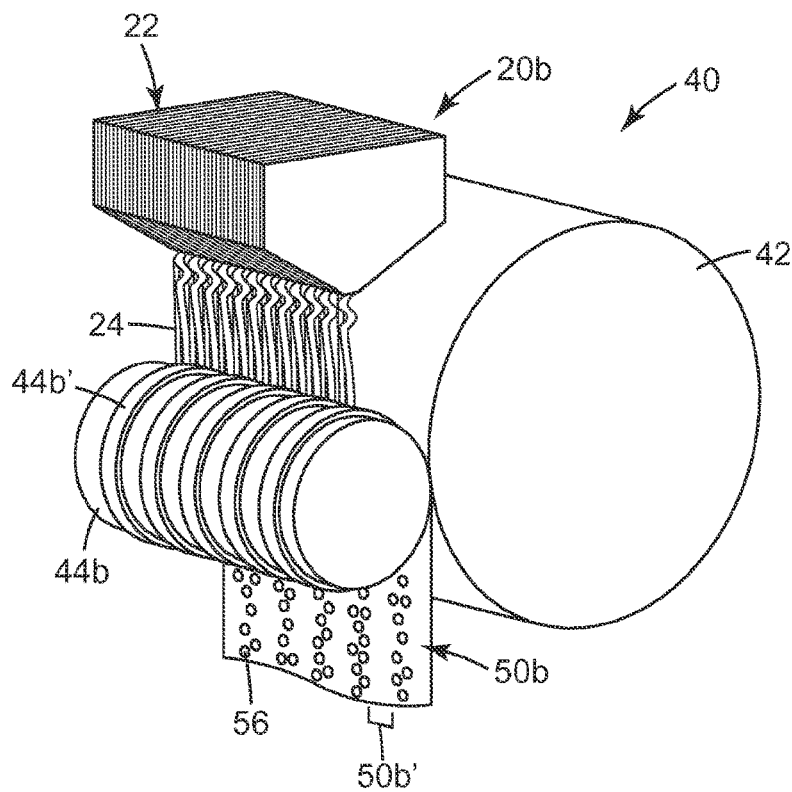
FIG. 19B is a schematic perspective view of an alternate nip roll.

Referring now to FIG. 19B, a schematic perspective view of another exemplary apparatus 20b with alternate nip roll 44b is shown. The surface of alternate nip roll 44b includes raised areas 44b' which apply more nipping force on polymeric netting 24 against backup roll 42 than the other areas of nip roll 44b. In the depicted embodiment, sufficient force has been applied by raised areas 44b' that openings 56 in polymeric layer 50b are separated by longitudinal bands 50b' of solid layer where the potential openings have been crushed completely closed within nip 40. Rather than raised areas, one or both of the rolls comprising the nip may have zones of different temperature, giving rise to longitudinal bands having no openings or different sized openings. Further, the relative thickness of the extruded polymeric netting has been found to affect the range of hole sizes; with a relatively thick netting it is easier to nip the melt to form longitudinal bands 50b' of solid film. In some embodiments, it may be desired to quench one side of the film at a faster rate than the other, in order to affect the shape of the opening's cross-section.

In some embodiments, it may be desirable to pattern one side or both sides of the layer. This can be achieved, for example, using patterning the surface of one or both of nip roller 44 and backup roller 42. It has been shown in the field of polymeric hook forming that the use of patterned rolls can preferentially move polymer in the cross direction or down-web direction. This concept can be used to shape the hole on one or both sides of the layer.

A first exemplary netting for making polymeric material described herein comprises an array of polymeric strands periodically joined together at bond regions throughout the array. The netting has first and second, generally opposed major surfaces. The bond regions are generally perpendicular to the first and second major surfaces. The array comprises a first plurality of strands having first and second, generally opposed major surfaces. The array comprises a second plurality of strands having first and second, generally opposed major surfaces. The first major surface of the netting comprises the first major surfaces of the first and second plurality of strands. The second major surface of the netting comprises the second major surfaces of the first and second plurality of strands. The first major surface of the first plurality of strands comprises a first material. The second major surface of the first plurality of strands comprises a second material. The first major surface of the second plurality of strands comprises a third material. The second major surface of the second plurality of strands comprises a fourth material. The first and second materials are different, and wherein the first material does not extend to the second major surface of the first plurality of strands. In some embodiments, the third material does not extend to the second major surface of the second plurality of strands. In some embodiments, at least two of the first, third, and fourth materials are the same. In some embodiments, at least three of the first, second, third, or fourth materials are the different. In some embodiments, the netting further comprises a fifth, different material between the first and second materials, and optionally a sixth, different material between the third and fourth materials.

A second exemplary netting for making polymeric layers described herein comprises an array of polymeric strands periodically joined together at bond regions throughout the array. The netting has first and second, generally opposed major surfaces. The bond regions are generally perpendicular to the first and second major surfaces. The array comprises a first plurality of strands having first and second, generally opposed major surfaces. The array comprises a second plurality of strands having first and second, generally opposed major surfaces. The first major surface of the netting comprises the first major surfaces of the first and second plurality of strands. The second major surface of the netting comprises the second major surfaces of the first and second plurality of strands. The first major surface of the first plurality of strands comprises a first material. The second major surface of the first plurality of strands comprises a second material. The first major surface of the second plurality of strands comprises a third material. The second major surface of the second plurality of strands comprises a fourth material. There is a fifth material disposed between the first and second materials. There is a sixth material disposed between the third and fourth materials, wherein the first and fifth materials are different. The first, second, third, and fourth are the same. The first material does not extend to the second major surface of the first plurality of strands. In some embodiments, the third material does not extend to the second major surface of the second plurality of strands.

In some embodiments, the first and sixth materials are the same. In some embodiments, the fifth and sixth materials are the same.

Suitable netting for making polymeric layers described herein include a method comprising:

providing an extrusion die comprising a plurality of shims positioned adjacent to one another, the shims together defining at least a first cavity, a second cavity, and a dispensing surface, wherein the dispensing surface has a first array of dispensing orifices alternating with a second array of dispensing orifices, wherein at least the first dispensing orifices are defined by an array of first vestibules, and wherein the plurality of shims comprises a plurality of a repeating sequence of shims, wherein the repeating sequence comprises: shims that provide a fluid passageway between the first cavity and one of the first vestibules, shims that provide a second passageway extending from the second cavity to the same vestibule, such that the area where the second fluid passageway enters the first vestibules is below the area where the first fluid passageway enters the first vestibules; and dispensing first polymeric strands from the first dispensing orifices at a first strand speed while simultaneously dispensing second polymeric strands from the second dispensing orifices at a second strand speed, wherein one of the strand speeds is at least 2 (in some embodiments, in a range from 2 to 6, or even 2 to 4) times the other strand speed to provide the netting. In some embodiments, the extrusion die further comprises a third passageway extending from a cavity to the first vestibule, such that the area where the second fluid passageway enters the first vestibule is above the area where the third fluid passageway enters the first vestibule. In some embodiments, each of the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

In another aspect, the present disclosure describes a first extrusion die having at least first and second cavities, a first passageway extending from the first cavity into a first vestibule defining a first dispensing orifice, and a second passageway extending from the second cavity to the vestibule, such that the area where the first fluid passageway enters the vestibule is above the area where the second fluid passageway enters the vestibule. In some embodiments, the extrusion die further comprises a third passageway extending from a cavity to the first vestibule, such that the area where the second fluid passageway enters the first vestibule is above the area where the third fluid passageway enters the first vestibule. In some embodiments, the extrusion die comprises a plurality of first vestibules, together defining a first dispensing array, and further comprises a plurality of second dispensing orifices, together defining a second dispensing array alternating along a dispensing surface with the first dispensing array, each of the second dispensing orifices having at least one passageway extending to a cavity, wherein in some embodiments, the second dispensing orifices are defined by a second vestibule, and each second vestibule has at least two passageways extending from it each to a different cavity, such that the area where one of those passageways enters the second vestibule is above the area where the other of those passageways enters the second vestibule.

In another aspect, the present disclosure describes a second extrusion die comprising a plurality of shims positioned adjacent to one another, the shims together defining at least a first cavity, a second cavity, and a dispensing surface, wherein the dispensing surface has an array of dispensing orifices defined by an array of vestibules, wherein the plurality of shims comprises a plurality of a repeating sequence of shims, wherein the repeating sequence comprises: shims that provide a fluid passageway between the first cavity and one of the vestibules, shims that provide a second passageway extending from the second cavity to the same vestibule, such that the area where the second fluid passageway enters the vestibule is below the area where the first fluid passageway enters the vestibule. In some embodiments, the second fluid passageway is diverted into branches that meet the first fluid passageway at areas above and below the first fluid passageways at the point where the second fluid passageway enters the vestibule.

In some embodiments, the extrusion die further comprises a third passageway extending from a cavity to the first vestibule, such that the area where the second fluid passageway enters the first vestibule is above the area where the third fluid passageway enters the first vestibule. In some embodiments, the extrusion die comprises a plurality of first vestibules, together defining a first dispensing array, and further comprises a plurality of second dispensing orifices, together defining a second dispensing array alternating along a dispensing surface with the first dispensing array, each of the second dispensing orifices having at least one passageway extending to a cavity, wherein in some embodiments, the second dispensing orifices are defined by a second vestibule, and each second vestibule has at least two passageways extending from it each to a different cavity, such that the area where one of those passageways enters the second vestibule is above the area where the other of those passageways enters the second vestibule.

In some embodiments, the plurality of shims comprises a plurality of at least one repeating sequence of shims that includes shims that provide a passageway between a first and second cavity and the first dispensing orifices. In some of these embodiments, there will be additional shims that provide a passageway between the first and/or the second cavity, and/or a third (or more) cavity and second dispensing orifices. Typically, not all of the shims of dies described herein have passageways, as some may be spacer shims that provide no passageway between any cavity and a dispensing orifice. In some embodiments, there is a repeating sequence that further comprises at least one spacer shim. The number of shims providing passageway to the first dispensing orifices may be equal or unequal to the number of shims providing a passageway to the second dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one or both of the cavities.

In some embodiments, the shims will be assembled according to a plan that provides a repeating sequence of shims of diverse types. The repeating sequence can have diverse numbers of shims per repeat. For example, referring to FIG. 10 (and FIG. 12, which is a more detailed view of FIG. 10), a sixteen-shim repeating sequence is shown which can be used with molten polymer to form a netting with three-layered strands alternating with each other so that a netting generally as depicted in FIG. 11 can be formed. As another for example, FIG. 18 (and FIG. 18A, which is a more detailed view of FIG. 18), a four-shim repeating sequence is shown which can be used with molten polymer to form a netting with two-layered strands alternating with each other so that a netting generally as depicted in FIG. 2 can be formed.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the dispensing orifice within, for example, a repeating sequence of shims, may be identical or different.

Figure 18:
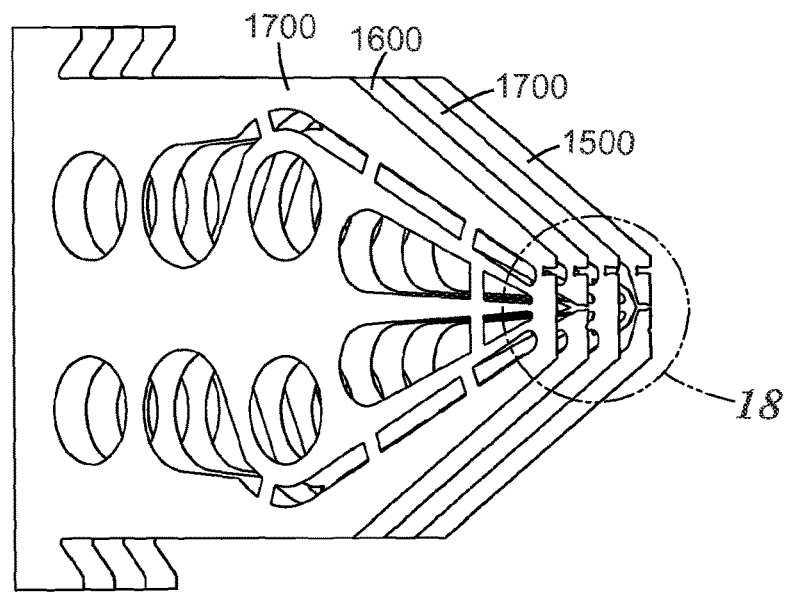
FIG. 18 is an exploded perspective view of a single instance of a repeating sequence of shims suitable for forming the netting of FIG. 2.
Figure 18A:
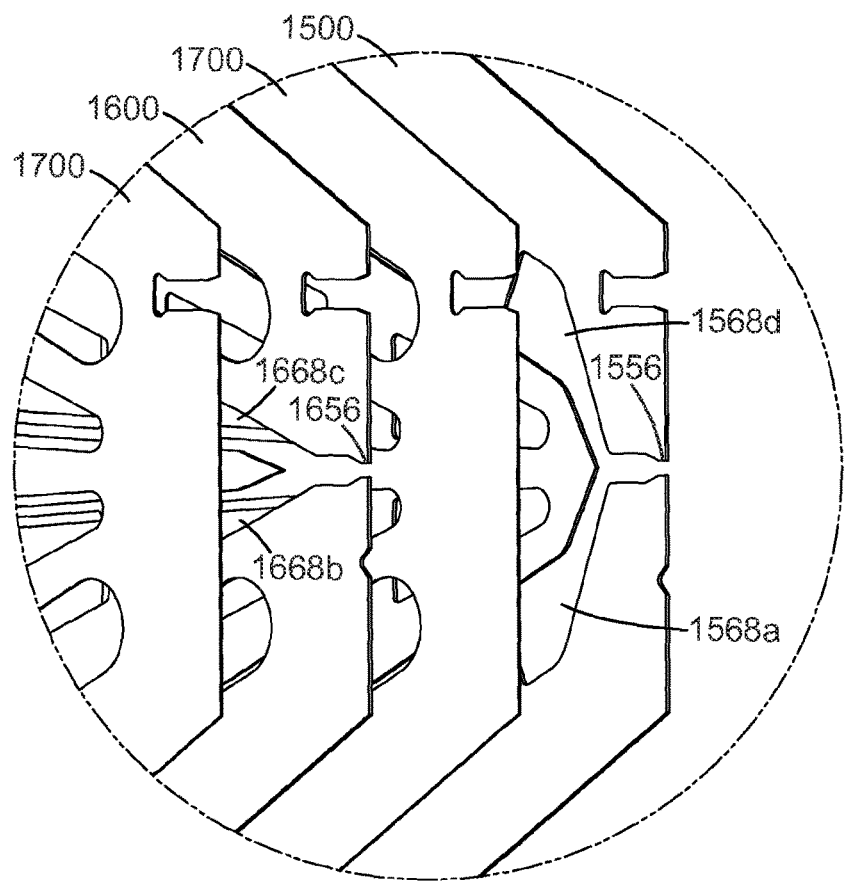
FIG. 18A is a detail view of the repeating sequence of shims of FIG. 18 emphasizing the dispensing surfaces.

Passageways from two cavities can meet together in a "Y" shape to form a two-layered strand (e.g., shims 1500 and 1600 in FIG. 18A. Additional cavities can be used to create layered strands of more than two layers by joining the passageways at the vestibule in a top down configuration. It may be desired to ratio the passageway opening to that of the desired layer ratio of the resultant strand. For example, a strand with a small top layer would have a die design with a relatively narrow passageway for the top cavity merging with a wide passageway for the bottom cavity. In some embodiments, three or more layers are present where two or more layers are the same material, and it may be desirable to use one cavity for the layers that are the same. A passageway can be created from a set of spacer shims (e.g., shims 400 and 800 in FIG. 10) to provide a passage within a vestibule (e.g., vestibule 1101 in FIG. 10). Into such a passageway, on each side of the vestibule, a furcated terminus (e.g., 364a in FIG. 3A) can feed into the vestibule from the side, and within the spacer shims, to provide one or more layers of the same material. In some embodiments, polymer for the top and bottom layers (as shown) of a three-layer construction from one side only may create a layer of varying thickness across the strand.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments, with respect to extrusion dies described herein, each of the dispensing orifices of the first and the second arrays have a width, and each of the dispensing orifices of the first and the second arrays are separated by up to two times the width of the respective dispensing orifice.

Typically, the passageway between cavity and dispensing orifice is up to 5 mm in length. In some embodiments, the first array of fluid passageways has greater fluid restriction than the second array of fluid passageways.

In some embodiments, for extrusion dies described herein, each of the dispensing orifices of the first and the second arrays have a cross sectional area, and each of the dispensing orifices of the first arrays has an area different than that of the second array.

Typically, the spacing between orifices is up to two times the width of the orifice. The spacing between orifices is greater than the resultant diameter of the strand after extrusion. This diameter is commonly referred to as die swell. This spacing between orifices is greater than the resultant diameter of the strand after extrusion leads to the strands repeatedly colliding with each other to form the repeating bonds of the netting. If the spacing between orifices is too great the strands will not collide with each other and will not form the netting.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

The size (same or different) of the strands can be adjusted, for example, by the composition of the extruded polymers, velocity of the extruded strands, and/or the orifice design (e.g., cross sectional area (e.g., height and/or width of the orifices)). For example, a first polymer orifice that is three times greater in area than the second polymer orifice can generate netting with equal strand sizes while meeting the velocity difference between adjacent strands.

In general, it has been observed that the rate of strand bonding is proportional to the extrusion speed of the faster strand. Further, it has been observed that this bonding rate can be increased, for example, by increasing the polymer flow rate for a given orifice size, or by decreasing the orifice area for a given polymer flow rate. It has also been observed that the distance between bonds (i.e., strand pitch) is inversely proportional to the rate of strand bonding, and proportional to the speed that the netting is drawn away from the die. Thus, it is believed that the bond pitch and the netting basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small strand orifice area. Additional general details for adjusting the relative speed of strands during net formation can be found, for example, in PCT Pub. No. WO 2013/028654 (Ausen et al.), published Feb. 28, 2013, the disclosure of which is incorporated herein by reference.

Typically, the polymeric strands are extruded in the direction of gravity. This facilitates collinear strands to collide with each other before becoming out of alignment with each other. In some embodiments, it is desirable to extrude the strands horizontally, especially when the extrusion orifices of the first and second polymer are not collinear with each other.

In practicing methods described herein, the polymeric materials might be solidified simply by cooling. This can be conveniently accomplished passively by ambient air, or actively by, for example, quenching the extruded polymeric materials on a chilled surface (e.g., a chilled roll). In some embodiments, the polymeric materials are low molecular weight polymers that need to be cross-linked to be solidified, which can be done, for example, by electromagnetic or particle radiation. In some embodiments, it is desirable to maximize the time to quenching to increase the bond strength.

Figure 10:
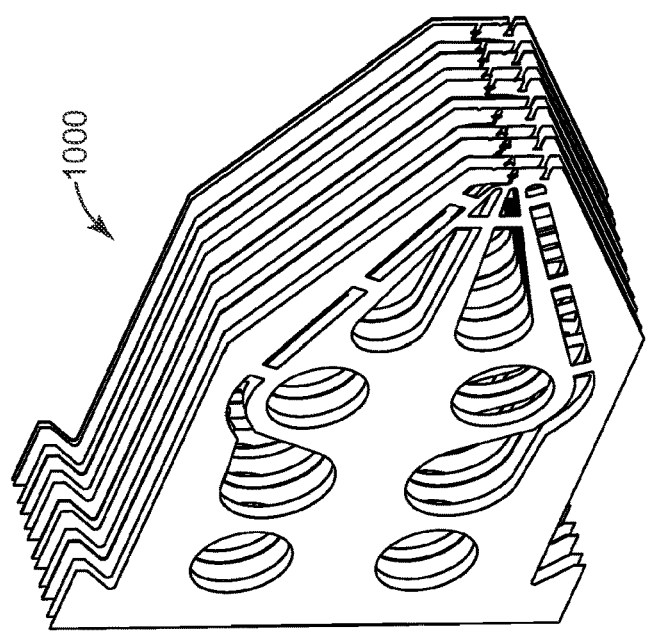
FIG. 10 is an exploded perspective view of a single instance of a repeating sequence of shims suitable to form the netting shown in FIG. 11.
Figure 12:
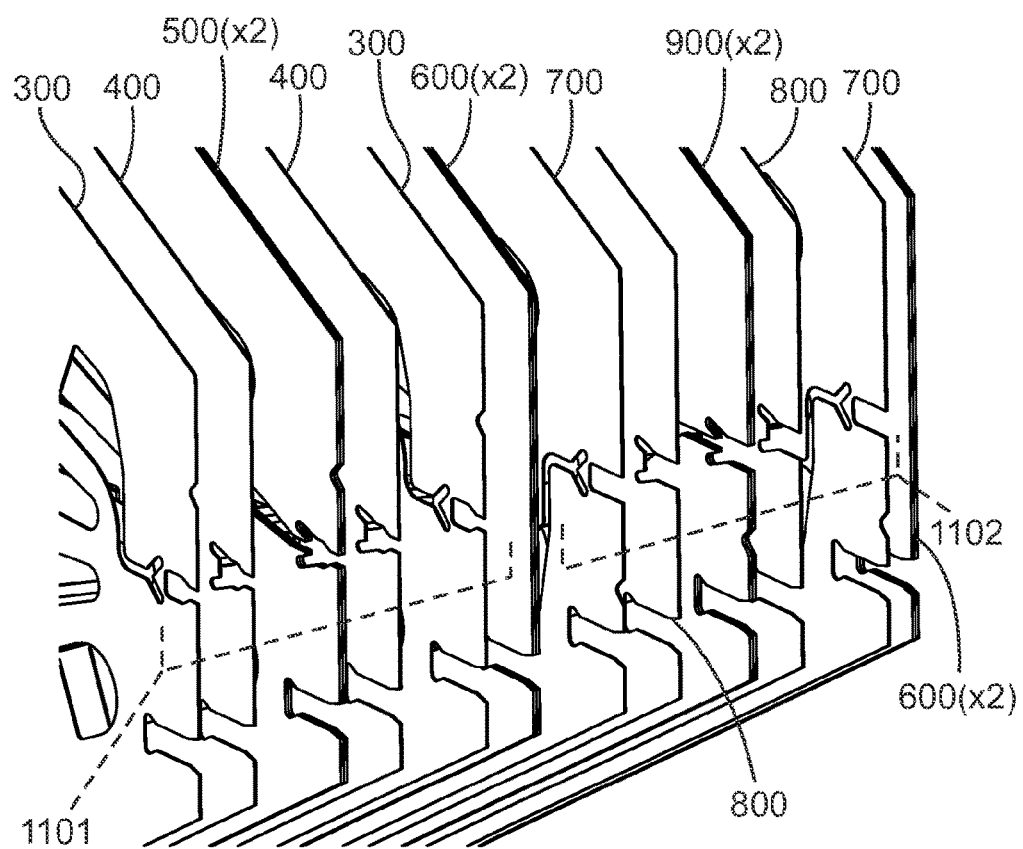
FIG. 12 is a detail view of the repeating sequence of shims of FIG. 10 emphasizing the dispensing surfaces.
Figure 13:
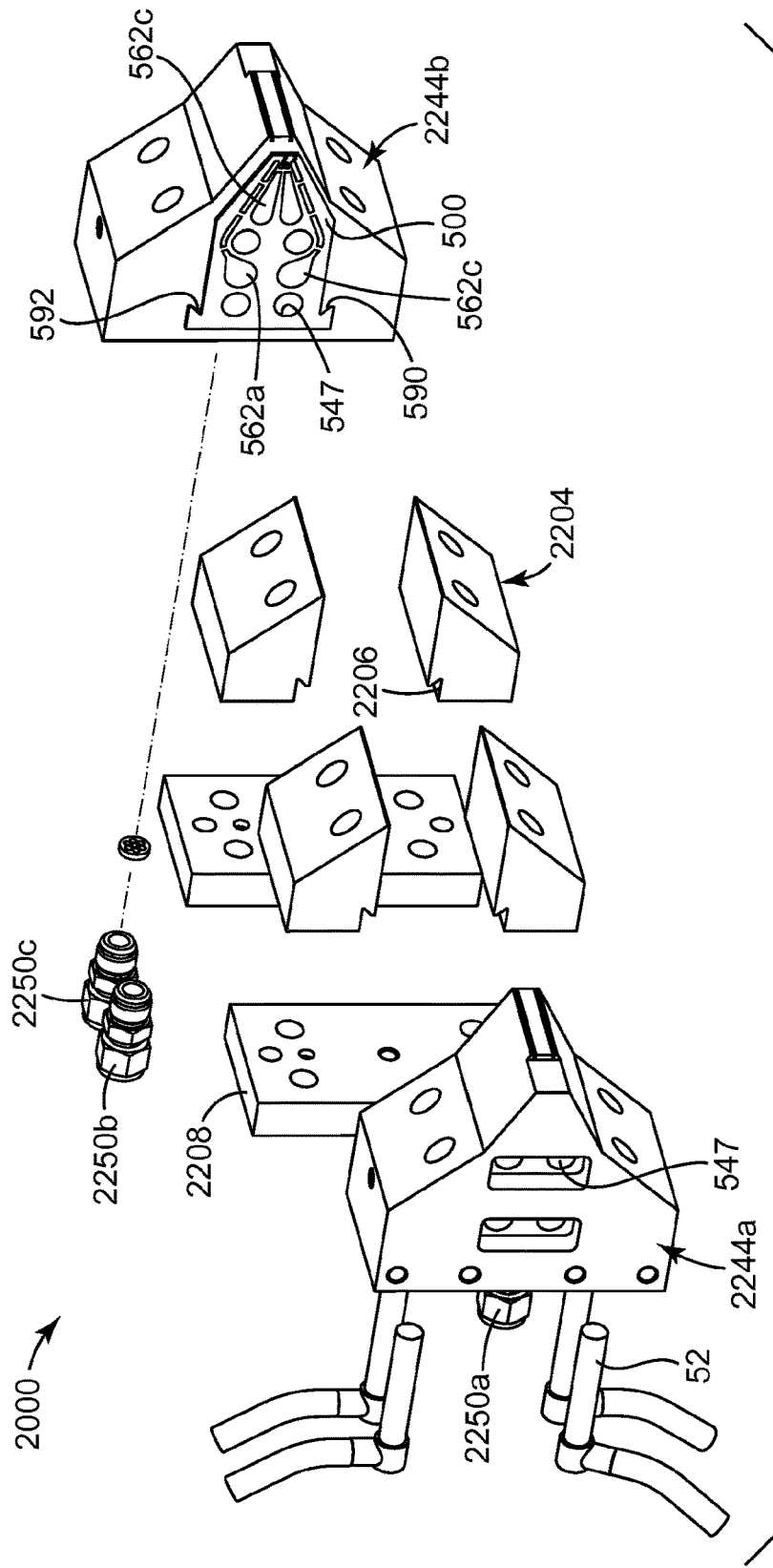
FIG. 13 is an exploded perspective view of an exemplary mount suitable for an extrusion die composed of multiple repeats of the repeating sequence of shims of FIG. 10.
Figure 14:
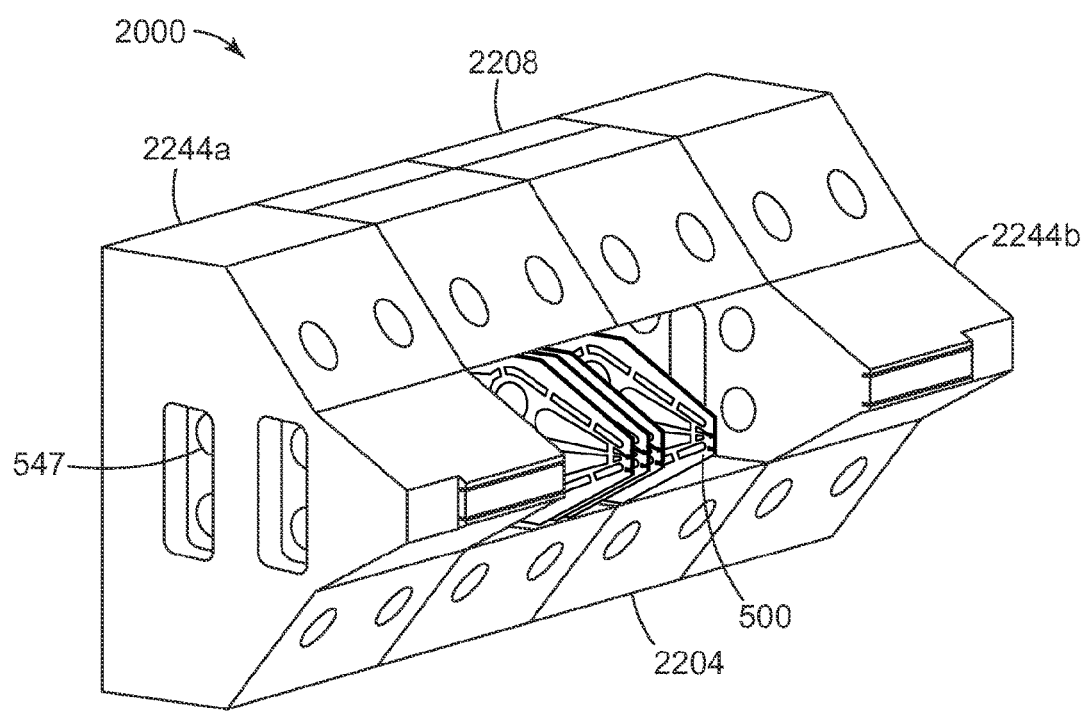
FIG. 14 is a perspective view of the mount of FIG. 13 in an assembled state.

Dies and methods described herein can be used to form netting where polymeric strands are formed of two different materials in a layered arrangement. FIGS. 3-9 illustrate exemplary shims useful for assembling an extrusion die capable of producing netting where both of the strands are of a layered, of optionally different materials. FIG. 10 is an exploded perspective assembly illustration of an exemplary repeating sequence employing those shims. FIG. 12 is a detail perspective view of the exemplary dispensing surface associated with the repeating sequence of FIG. 10. FIG. 13 is an exploded perspective view of a mount suitable for an extrusion die composed of multiple repeats of the repeating sequence of shims of FIG. 10. FIG. 14 shows the mount of FIG. 13 in an assembled state.

Referring now to FIG. 3, a plan view of shim 300 is illustrated Shim 300 has first aperture 360a, second aperture 360b, third aperture 360c, and fourth aperture 360d. When shim 300 is assembled with others as shown in FIGS. 10 and 12, aperture 360a helps define first cavity 362a, aperture 360b helps define second cavity 362b, aperture 360c helps define third cavity 362c and aperture 360d helps define fourth cavity 362d. Shim 300 has several holes 47 to allow the passage of, for example, bolts to hold shim 300 and others to be described below into an assembly. Shim 300 has dispensing surface 367, and in this particular embodiment, dispensing surface 367 has indexing groove 380 and identification notch 382. Shim 300 has shoulders 390 and 392. Shim 300 has dispensing opening 356, but it will be noted that this shim has no integral connection between dispensing opening 356 and any of cavities 362a, 362b, 362c, or 362d. There is no connection, for example, from cavity 362a to dispensing opening 356, via, for example, passageway 368a, but the flow has a route to the dispensing surface in the perpendicular-to-the-plane-of-the-drawing dimension when shim 300 is assembled with shim 400 as illustrated in assembly drawing (see FIG. 12). This facilitates material to flow all the way to point 364a. More particularly, passageway 368a has furcated terminus 364a to direct material from cavity 362a into a passageway in the adjacent shim as will be discussed below in connection with FIG. 4. Passageway 368a, furcated terminus 364a, and dispensing opening 356 may be more clearly seen in the expanded view shown in FIG. 3A.

Referring now to FIG. 4, a plan view of shim 400 is illustrated Shim 400 has first aperture 460a, second aperture 460b, third aperture 460c, and fourth aperture 460d. When shim 400 is assembled with others as shown in FIGS. 10 and 12, aperture 460a helps define first cavity 362a, aperture 460b helps define second cavity 362b, aperture 460c helps define third cavity 362c, and aperture 460d helps define fourth cavity 362d. Shim 400 has dispensing surface 467, and in this particular embodiment, dispensing surface 467 has indexing groove 480 and identification notch 482. Shim 400 has shoulders 490 and 492. Shim 400 has dispensing opening 456, but it will be noted that this shim has no integral connection between dispensing opening 456 and any of cavities 362a, 362b, 362c, or 362d. Rather, blind recess 494 behind dispensing openings 456 has two furcations and provides a path to allow a flow of material from the furcated terminus 364a as discussed above in connection with FIG. 3. Blind recess 494 has two furcations to direct material from passageways 368a into top and bottom layers on either side of the middle layer provided by second polymeric composition emerging from third cavity 568c. When the die is assembled as shown in FIG. 12, the material flowing into blind recess 494 will form, for example, layers 11231 and 11232 in strand 11221 of FIG. 11. Blind recess 494 and dispensing opening 456 may be more clearly seen in the expanded view shown in detail drawing FIG. 4A.

Referring now to FIG. 5, a plan view of shim 500 is illustrated Shim 500 has first aperture 560a, second aperture 560b, third aperture 560c, and fourth aperture 560d. When shim 500 is assembled with others as shown in FIGS. 10 and 12, aperture 560a helps define first cavity 362a, aperture 560b helps define second cavity 362b, aperture 560c helps define third cavity 362c, and aperture 560d helps define fourth cavity 362d. Shim 500 has dispensing surface 567, and in this particular embodiment, dispensing surface 567 has indexing groove 580 and an identification notch 582. Shim 500 has shoulders 590 and 592. It might seem that there is no path from cavity 362c to dispensing opening 556, via, for example, passageway 568c, but the flow has a route in the perpendicular-to-the-plane-of-the-drawing dimension when the sequence of FIGS. 10 and 12 is completely assembled. Passageway 568c includes furcations 548 that further conduct the flow of a molten polymeric composition from cavity 362a via furcations 494 in shim 400. When assembled and in use, molten material from cavity 362c flows through passageway 568c to form material 11255 in strand 11221 in FIG. 11. These structures may be more clearly seen in the detail view of FIG. 5A.

Figure 6:
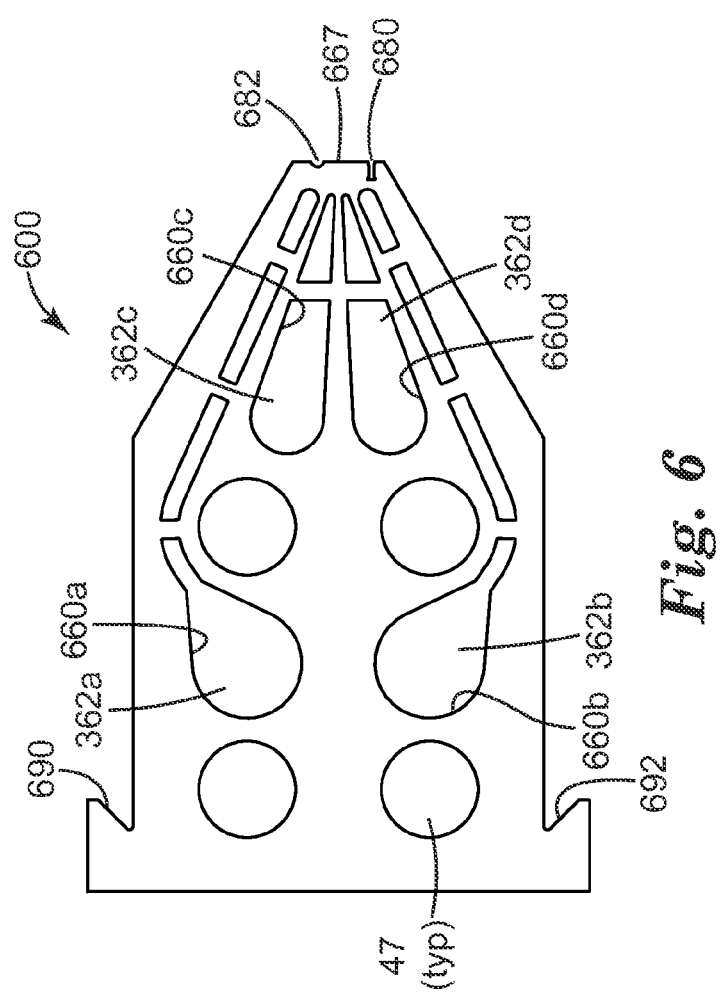
FIG. 6 is a plan view of another exemplary shim suited to form a repeating sequence of shims capable of forming a netting having two different types of strands each of optionally two different materials in a three layered arrangement.

Referring now to FIG. 6, a plan view of shim 600 is illustrated Shim 600 has first aperture 660a, second aperture 660b, third aperture 660c, and fourth aperture 660d. When shim 600 is assembled with others as shown in FIGS. 10 and 12, aperture 660a helps define first cavity 362a, aperture 660b helps define second cavity 362b, aperture 660c helps define third cavity 362c, and aperture 660d helps define fourth cavity 362d. Shim 600 has dispensing surface 667, and in this particular embodiment, dispensing surface 667 has indexing groove 680 and identification notch 682. Shim 600 has shoulders 690 and 692. There is no passage from any of the cavities to dispensing surface 667, as this shim creates a non-dispensing area along the width of the die, in actual use separating the shims producing first strand 11221 from the shims producing second strand 11222.

Referring now to FIG. 7, a plan view of shim 700 is illustrated Shim 700 is a near reflection of shim 300, and has first aperture 760a, second aperture 760b, third aperture 760c, and fourth aperture 760d. When shim 700 is assembled with others as shown in FIGS. 10 and 12, aperture 760a helps define first cavity 362a, aperture 760b helps define second cavity 362b, aperture 760c helps define third cavity 362c, and aperture 760d helps define fourth cavity 362d Shim 700 has several holes 47 to allow the passage of, for example, bolts to hold shim 700 and others to be described below into an assembly. Shim 700 has dispensing surface 767, and in this particular embodiment, dispensing surface 767 has indexing groove 780 and an identification notch 782. Shim 700 has shoulders 790 and 792. Shim 700 has dispensing opening 756, but it will be noted that this shim has no integral connection between dispensing opening 756 and any of the cavities 362a, 362b, 362c, or 362d. There is no direct connection, for example, from cavity 362b to dispensing opening 756, via, for example, passageway 768b, but the flow has a route to the dispensing surface in the perpendicular-to-the-plane-of-the-drawing dimension when shim 700 is assembled with shim 800 as illustrated in assembly drawing FIG. 12. This facilitates material to flow all the way to point 769b. More particularly, passageway 768b has furcated terminus 769b to direct material from cavity 362b into a passageway in the adjacent shim as will be discussed below in connection with FIG. 8.

Passageway 768b, furcated terminus 769b, and dispensing opening 756 may be more clearly seen in the detail view shown in FIG. 7A. It will be observed that the shape of dispensing opening 756 is slightly different from dispensing opening 356 in FIG. 3. This illustrates that netting for making polymeric layers described herein does not require that the first and second strands (11221 and 11222 in FIG. 11) be the same size.

Referring now to FIG. 8, a plan view of shim 800 is illustrated Shim 800 is a near reflection of shim 400, and has first aperture 860a, second aperture 860b, third aperture 860c, and fourth aperture 860d. When shim 800 is assembled with others as shown in FIGS. 10 and 12, aperture 860a helps define first cavity 362a, aperture 860b helps define second cavity 362b, aperture 860c helps define third cavity 362c, and aperture 860d helps define fourth cavity 362d Shim 800 has dispensing surface 867, and in this particular embodiment, dispensing surface 867 has indexing groove 880 and an identification notch 882. Shim 800 has shoulders 890 and 892. Shim 800 has dispensing opening 856, but it will be noted that this shim has no integral connection between dispensing opening 856 and any of the cavities 362a, 362b, 362c, or 362d. Rather, blind recess 894 behind dispensing openings 856 has two furcations and provides a path to allow a flow of material from furcated terminus 769b as discussed above in connection with FIG. 7. The two furcations on blind recess 894 has direct material from passageway 768b into top and bottom layers on either side of the middle layer provided by the polymeric composition emerging from fourth cavity 362d as will be discussed with more particularity in connection with FIG. 9 below. When the die is assembled as shown in FIG. 12, the material flowing into blind recess 894 will form, for example, layers 11241 and 11242 in strand 11222 (see FIG. 11). Blind recess 894 and dispensing opening 856 may be more clearly seen in the expanded view shown in detail drawing FIG. 8A. Analogous from the observation made in connection with FIG. 7A above, it will be observed that the shape of dispensing opening 856 is slightly different from dispensing opening 456 in FIG. 4. This illustrates that the netting for making polymeric layers described herein does not require that the first and second strands (11221 and 11222 in FIG. 11) be the same size.

Referring now to FIG. 9, a plan view of shim 900 is illustrated Shim 900 has first aperture 960a, second aperture 960b, third aperture 960c, and fourth aperture 960d. When shim 900 is assembled with others as shown in FIGS. 10 and 12, aperture 960a helps define first cavity 362a, aperture 960b helps define second cavity 362b, aperture 960c helps define third cavity 362c, and aperture 960d helps define fourth cavity 362d. Shim 900 has dispensing surface 967, and in this particular embodiment, dispensing surface 967 has indexing groove 980 and an identification notch 982. Shim 900 has shoulders 990 and 992. It might seem that there is no path from cavity 362d to dispensing opening 556, via, for example, passageway 968d, but the flow has a route in the perpendicular-to-the-plane-of-the-drawing dimension when the sequence of FIGS. 10 and 12 is completely assembled. Passageway 968d includes furcations 994 that further conduct the flow of a molten polymeric composition from cavity 362b via the furcations 894 in shim 800. When assembled and in use, molten material from cavity 362d flows through passageway 968d to form material 11256 in strand 11222 (see FIG. 11). These structures may be more clearly seen in the detail view of FIG. 9A.

Referring new to FIG. 10, an exploded perspective view of a single instance of a sixteen-shim repeating sequence 1000 of shims 300, 400, 500, 600, 700, 800, and 900, suitable to form, for example, netting 11200 shown in FIG. 11, is illustrated. FIG. 12 is a detail view of the repeating sequence of shims 1000 of FIG. 10 emphasizing the dispensing surfaces. In FIG. 12, it can be appreciated that when shims 300, 400, and 500, are assembled together, first vestibule 1101 is formed having a dispensing orifice jointly defined by the dispensing openings of the shims. Similarly, when shims 700, 800, and 900, are assembled together, second vestibule 1102 is formed having a dispensing orifice jointly defined by the dispensing openings of those shims. It should be noted that in the depicted embodiment the area of the dispensing orifices associated with first vestibule 1101 is one half that of the dispensing orifices associated with the second vestibule 1102. This facilitates dispensing first polymeric strands from the first dispensing orifices at a first strand speed while simultaneously dispensing second polymeric strands from the second dispensing orifices at a second strand speed while keeping the total relative flowrate from the first and second vestibules 1101 and 1102 the same. Whether by making sizes of the orifices different or by varying the pressure of the molten polymer within the cavities, netting is properly formed when one of the strand speeds is at least two (in some embodiments, in a range from 2 to 6, or even 2 to 4) times the other strand speed.

Referring now to FIG. 13, an exploded perspective view of a mount 2000 suitable for an extrusion die composed of multiple repeats of sequences of shims of FIGS. 10 and 12 is illustrated. Mount 2000 is particularly adapted to use shims 300, 400, 500, 600, 700, 800, and 900 as shown in FIGS. 3-9. However for visual clarity, only a single instance of shim 500 is shown in FIG. 13. The multiple repeats of sequences of shims of FIGS. 10 and 12 are compressed between two end blocks 2244a and 2244b. Conveniently, through bolts can be used to assemble the shims to the end blocks 2244a and 2244b, passing through holes 47 in shims 300, 400, 500, 600, 700, 800, and 900.

In this embodiment, four inlet fittings 2250a, 2250b, and 2250c (and fourth inlet fitting hidden in this view on the far side of end block 2244a) provide a flow path for four streams of molten polymer through end blocks 2244a and 2244b to cavities 362a, 362b, 362c, and 362d. Compression blocks 2204 have a notch 2206 that conveniently engages the shoulders on the shims (e.g., 390 and 392 on 300). When mount 2230 is completely assembled, compression blocks 2204 are attached by, for example, machine bolts to backplates 2208. Holes are conveniently provided in the assembly for the insertion of cartridge heaters 52.

Referring now to FIG. 14, a perspective view of mount 2000 of FIG. 13 is illustrated in a partially assembled state. A few shims (e.g., 500) are in their assembled positions to show how they fit within mount 2000, but most of the shims that would make up an assembled die have been omitted for visual clarity.

Figure 15:
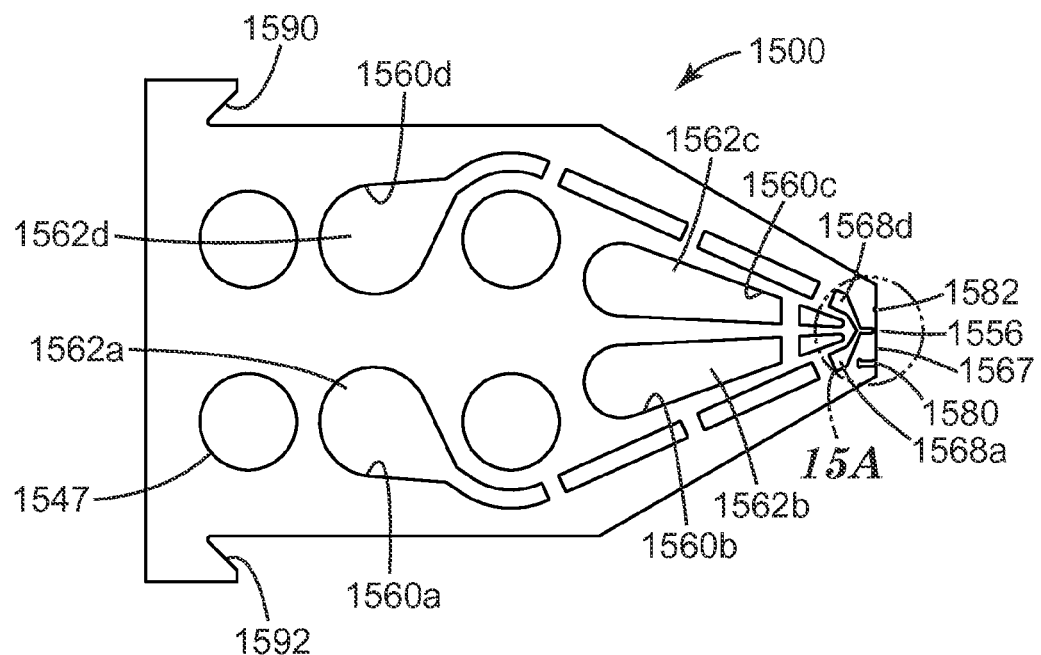
FIG. 15 is a plan view of an exemplary shim suitable for forming a repeating sequence of shims capable of forming a netting having strands each of two different materials in an over/under arrangement as generally illustrated in FIG. 2.
Figure 16:
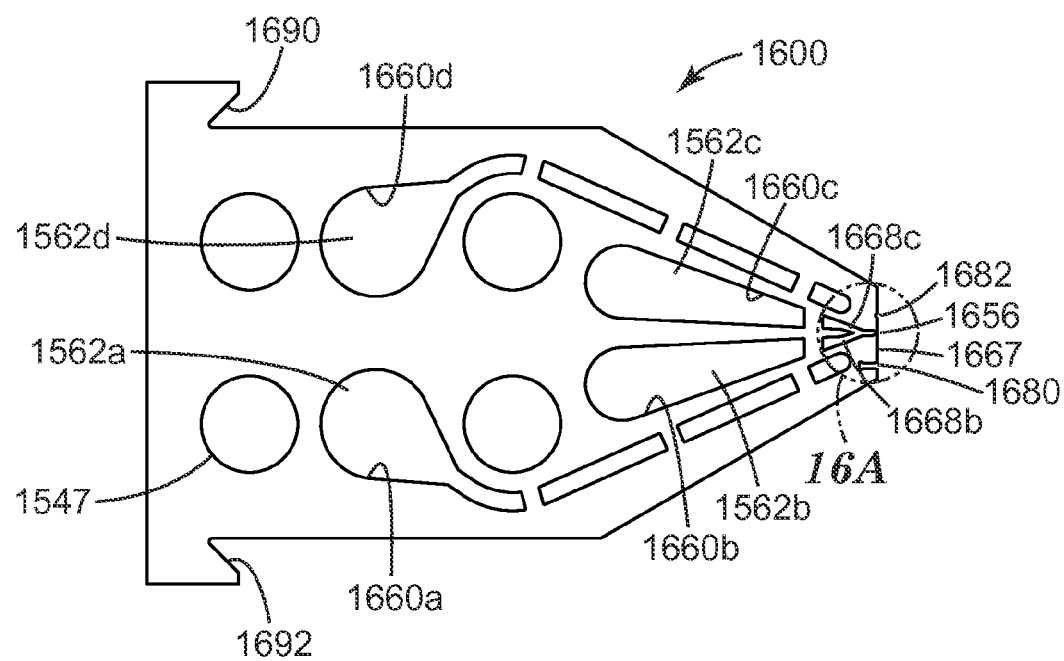
FIG. 16 is a plan view of another exemplary shim suitable for forming a repeating sequence of shims capable of forming a netting having strands each of two different materials in an over/under arrangement as generally illustrated in FIG. 2.
Figure 17:
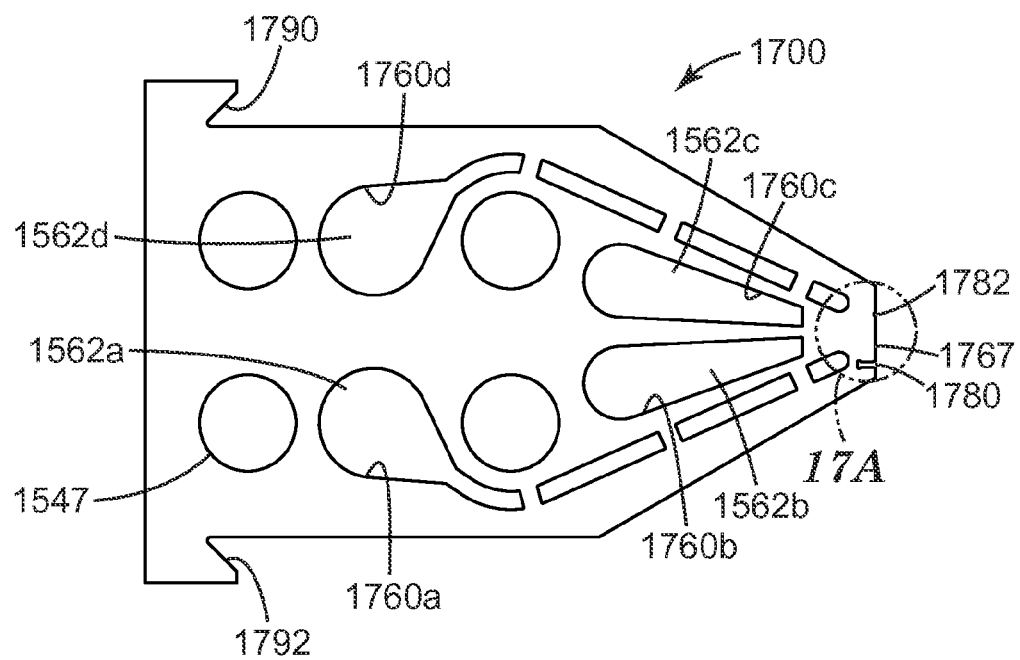
FIG. 17 is a plan view of another exemplary shim suitable for forming a repeating sequence of shims capable of forming a netting having strands each of two different materials in an over/under arrangement as generally illustrated in FIG. 2.

Another exemplary embodiment of a plurality of shims useful for an extrusion die according to the present disclosure is illustrated in FIGS. 15-18. A netting in which the strands have first and second layers (e.g., with each layer in each of the first and second segments being of a different polymeric composition), as generally depicted in FIG. 2, can conveniently be extruded from this extrusion die. Referring now to FIG. 15, a plan view of shim 1500 is illustrated Shim 1500 is useful, for example, in a sequence of shims shown in FIGS. 18 and 18A. Other shims useful in this sequence are shown, for example, in FIGS. 16 and 17. Shim 1500 has first aperture 1560a, second aperture 1560b, third aperture 1560c, and fourth aperture 1560d. When shim 1500 is assembled with others as shown in FIGS. 18 and 18A, first aperture 1560a helps define first cavity 1562a, second aperture 1560b helps define second cavity 1562b, third aperture 1560c helps define third cavity 1562c, and fourth aperture 1560d helps define fourth cavity 1562d. As will be further discussed below, molten polymer in cavities 1562a and 1562d can be extruded in layered first strands, and molten polymer in cavities 1562b and 1562c can be extruded in layered second strands between those layered first segments, and so as to form netting, for example, similar to the netting shown in FIG. 2 but having layered first strands as well as layered second strands.

Figure 15A:
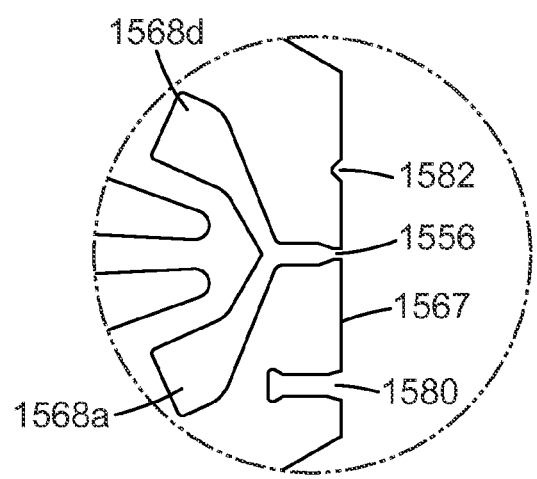
FIG. 15A is a detail view of the section referenced as "detail 15A" in FIG. 15.

Shim 1500 has several holes 1547 to allow the passage of, for example, bolts to hold shim 1500 and others to be described below into an assembly. Shim 1500 has dispensing opening 1556 in dispensing surface 1567. Dispensing opening 1556 may be more clearly seen in the expanded view shown in FIG. 15A. It might appear that there are no paths from cavities 1562a and 1562d to dispensing opening 1556, via, for example, passageways 1568a and 1568d, but the flow has a route in the perpendicular-to-the-plane-of-the-drawing dimension when the sequence of FIGS. 18 and 18A, for example, is completely assembled. In the illustrated embodiment, dispensing surface 1567 has indexing groove 1580 which can receive an appropriately shaped key to facilitate assembling diverse shims into a die. The shim may also have identification notch 1582 to help verify that the die has been assembled in the desired manner. This embodiment of the shim has shoulders 1590 and 1592, which can assist in mounting the assembled die as described above in connection with FIG. 13.

Figure 16A:
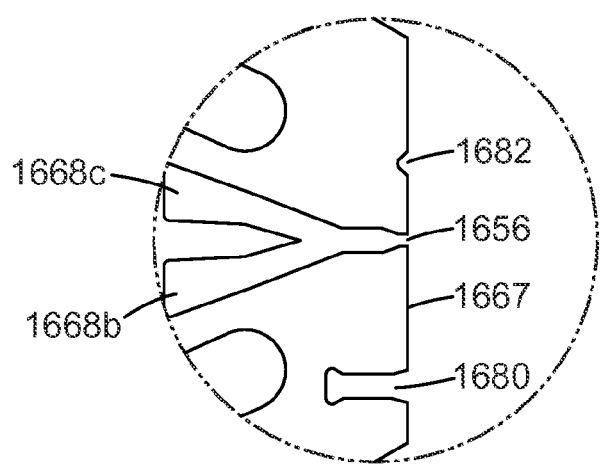
FIG. 16A is a detail view of the section referenced as "detail 16A" in FIG. 16.

Referring now to FIG. 16, a plan view of shim 1600 is illustrated. Shim 1600 has first aperture, 1660a, second aperture 1660b, third aperture 1660c, and fourth aperture 1660d. When shim 1600 is assembled with others as shown in FIGS. 18 and 18A, first aperture 1660a helps define first cavity 1562a, second aperture 1660b helps define second cavity 1562b, third aperture 1660c helps define third cavity 1562c, and fourth aperture 1660d helps define fourth cavity 1562d. Analogous to shim 1500, shim 1600 has dispensing surface 1667, and in this particular embodiment, dispensing surface 1667 has indexing groove 1680 and identification notch 1682. Also analogous to shim 1500, shim 1600 has shoulders 1690 and 1692. It might appear that there are no paths from cavities 1562b and 1562c to dispensing opening 1656, via, for example, passageway 1668b and 1668c, respectively, but the flow has a route in the perpendicular-to-the-plane-of-the-drawing dimension when the sequence of FIGS. 18 and 18A, for example, is completely assembled. Dispensing opening 1656 may be more clearly seen in the expanded view shown in FIG. 16A.

Figure 17A:
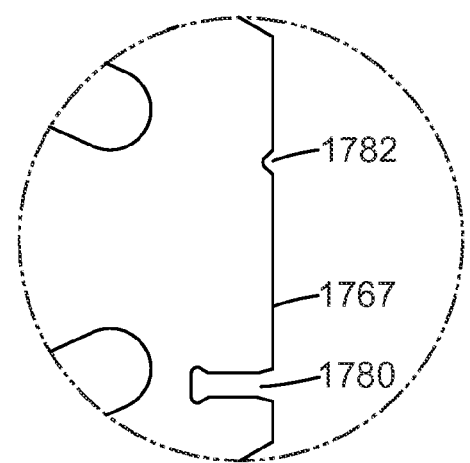
FIG. 17A is a detail view of the section referenced as "detail 17A" in FIG. 17.

Referring now to FIG. 17, a plan view of shim 1700 is illustrated. Shim 1700 has first aperture 1760a, second aperture 1760b, third aperture 1760c, and fourth aperture 1760d. When shim 1700 is assembled with others as shown in FIGS. 17 and 17A, first aperture 1760a helps define first cavity 1562a, second aperture 1760b helps define second cavity 1562b, third aperture 1760c helps define third cavity 1562c, and fourth aperture 1760d helps define fourth cavity 1562d. Analogous to shim 1500, shim 1700 has dispensing surface 1767, and in this particular embodiment, dispensing surface 1767 has indexing groove 1780. Also analogous to shim 1500, shim 1700 has shoulders 1790 and 1792. However, shim 1600 has no dispensing opening, but rather serves to separate the flows from dispensing orifices 1556 and 1656 (see FIGS. 15 and 16) so that separate strands 10121 and 10122 (see FIG. 2) will be formed. The dispensing surface 1767 and its associated features may be more clearly seen in the expanded view shown in FIG. 17A.

Referring now to FIG. 18, a perspective assembly drawing of a sequence of shims employing the shims of FIGS. 15-17 so as to produce layered first and second segments is shown. Shims 1500 and 1600 are separated by shims 1700 to produce separate layered first and second strands. More particularly, proceeding from left to right in FIGS. 18 and 18A, one or more instances of shim 1700 and one or more instances of a shim 1600 serve to create, for example, strand 10121 (see FIG. 2), and one or more instances of shim 1700 and one or more instances of shim 1500 serve to create, for example, strand 10122 (see FIG. 2). More than one of each of shims 1600 and 1500 may be used together in a sequence depending on the thickness of the shims and the desired width of the layered first and second strands. For example, one or more instances of shim 1700 can be followed by a number of shims 1600, and one or more instances of shim 1700 can be followed by the same or different number of shims 1500. When assembled as shown in FIG. 18A the dispensing openings 1556 and 1656 in shims 1500 and 1600, respectively, define dispensing openings having a vestibules behind them. And when multiple instances of the depicted repeating sequence of shims are assembled into a die, a first and as second array of dispensing orifices is this formed.

Modifications of the shims shown in FIGS. 3-10, 12, and 15-18 can be useful for making other embodiments of netting for making polymeric layers described herein. For example, the shims shown in FIGS. 3-10 and 12 can be modified to have only two cavities, and first passageways 568a and third passageways 868c can be modified to extend from the same cavity. With this modification, netting having first and second strands 11221 and 11222 as depicted in FIG. 11, where the first strand 11221 and second strand 11222 have layers of identical composition can be made. In other embodiments, the shims shown in FIGS. 3-10 and 12 can be modified to provide first and/or second strands that have four, five, or even more layers. In planning and using such modifications, it remains necessary to arrange for the differential between the first and second speed speeds, either with restrictions in the passageways, restrictions in the dispensing orifices, or control of the flowrate of polymer via the pressure in the cavities.

Portions of the exteriors of the first and second strands bond together at the bond regions. In methods described herein for making nettings for making polymeric layers described herein, the bonding occurs in a relatively short period of time (typically less than 1 second). The bond regions, as well as the strands typically cool through air and natural convection and/or radiation. In selecting polymers for the strands, in some embodiments, it may be desirable to select polymers of bonding strands that have dipole interactions (or H-bonds) or covalent bonds. Bonding between strands has been observed to be improved by increasing the time that the strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization. In some embodiments, the bond strength is greater than the strength of the strands forming the bond. In some embodiments, it may be desirable for the bonds to break and thus the bonds will be weaker than the strands.

Suitable polymeric materials for extrusion from dies described herein, methods described herein, and for nettings for making polymeric layers described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for making netting for making polymeric layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for making polymeric layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. Exemplary release materials for extrusion from dies described herein, methods described herein, and for making polymeric layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Publication No. WO96039349, published Dec. 12, 1996, low density polyolefin materials such as those described in U.S. Pat. No. 6,228,449 (Meyer), U.S. Pat. No. 6,348,249 (Meyer), and U.S. Pat. No. 5,948,517 (Adamko et al.), the disclosures of which are incorporated herein by reference.

In some embodiments, at least one of the first, second, third, or fourth materials comprises an adhesive (including pressure sensitive adhesives). In some embodiments, netting described herein, at least some of the polymeric strands comprise a first polymer that is a thermoplastic (e.g., adhesives, nylons, polyesters, polyolefins, polyurethanes, elastomers (e.g., styrenic block copolymers), and blends thereof).

In some embodiments, one or both of the major surfaces of nettings described herein comprise a hot melt or pressure sensitive adhesive. In some embodiments, the first polymeric strands and the second polymeric strands are both formed with an over/under arrangement. In particular, the first polymeric strands may have a first major surface of a first polymeric material and a second major surface of a second, different polymeric material, and the second polymeric strands may have a first major surface of a third polymeric material and a second major surface of a fourth, polymeric material. The die design for this scenario utilizes cavities. In some embodiments, the first polymeric strands and the second polymeric strands are both formed with a layered arrangement. In particular, the first polymeric strands may have a first major surface and a second major surface of a first polymeric material sandwiching a center of a second, different polymeric material, and the second polymeric strands may have first and second major surface of a third polymeric material sandwiching a center of a fourth, polymeric material. The die design for this scenario utilizes four cavities.

In some embodiments, polymeric materials of the polymeric layers described herein and nettings for making polymeric layers described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors. When colored strands are of a relatively fine (e.g., less than 50 micrometers) diameter, the appearance of the web may have a shimmer reminiscent of silk.

In some embodiments, strands netting for making polymeric layers described herein do not substantially cross over each other (i.e., at least 50 (at least 55, 60, 65, 70, 75, 80, 85, 90, 95, 99, or even 100) percent by number).

In some embodiments, netting for making polymeric layers described herein have a thickness up to 750 micrometers (in some embodiments, up to 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers), although thicknesses outside of these size are also useful.

In some embodiments, the polymeric strands of netting for making polymeric layers described herein have an average width in a range from 10 micrometers to 500 micrometers ((in some embodiments, in a range from 10 micrometers to 400 micrometers, or even 10 micrometers to 250 micrometers), although other sizes are also useful.

In some embodiments, netting for making polymeric layers described herein, the bond regions of the netting have an average largest dimension perpendicular to the strand thickness, wherein the polymeric strands of the netting have an average width, and wherein the average largest dimension of the bond regions of the netting is at least two (in some embodiments, at least 2.5, 3, 3.5, or even at least 4) times greater than the average width of the polymeric strands of the netting.

To facilitate converting netting to the polymeric layers described herein having blind holes, in some embodiments, the layer creating the continuous layer has a lower melting or softening temperature than the layer providing the blind holes, the continuous layer is formed from a material that crystallizes slower than that of the blind holes side, the nip roll that forms the continuous layer is at a higher temperature than that of the blind holes side, and/or the nip roll that forms the continuous layer has embossing patterns to enable the layer flow and create a continuous layer.

In some embodiments, the first material layer of the netting has a thickness in a range from 2 micrometers to 750 micrometers (in some embodiments, in a range from 5 micrometers to 500 micrometers, or even 25 micrometers to 250 micrometers), although thicknesses outside of these sizes are also useful. In some embodiments, the second material layer of the netting has a thickness in a range from 2 micrometers to 750 micrometers (in some embodiments, in a range from 5 micrometers to 500 micrometers, or even 25 micrometers to 250 micrometers), although thicknesses outside of these sizes are also useful. In some embodiments, the third material layer of the netting has a thickness in a range from 2 micrometers to 750 micrometers (in some embodiments, in a range from 5 micrometers to 500 micrometers, or even 25 micrometers to 250 micrometers), although thicknesses outside of these sizes are also useful. In some embodiments, the fourth material layer of the netting has a thickness in a range from 2 micrometers to 750 micrometers (in some embodiments, in a range from 5 micrometers to 500 micrometers, or even 25 micrometers to 750 micrometers), although thicknesses outside of these sizes are also useful. In some embodiments, the fifth material layer of the netting has a thickness in a range from 2 micrometers to 750 micrometers (in some embodiments, in a range from 5 micrometers to 500 micrometers, or even 25 micrometers to 250 micrometers), although thicknesses outside of these sizes are also useful. In some embodiments, the sixth material layer of the netting has a thickness in a range from 2 micrometers to 750 micrometers (in some embodiments, in a range from 5 micrometers to 500 micrometers, or even 25 micrometers to 250 micrometers), although thicknesses outside of these sizes are also useful.

In some embodiments, netting for making polymeric layers described herein have a basis weight in a range from 5 g/m$^2$ to 600 g/m$^2$ (in some embodiments, 10 g/m$^2$ to 600 g/m$^2$, 10 g/m$^2$ to 400 g/m$^2$, or even 400 g/m$^2$ to 600 g/m$^2$), for example, netting as-made from dies described herein, although basis weights outside of these sizes are also useful.

In some embodiments, netting for making polymeric layers described herein has a strand pitch (i.e., center point-to-center point of adjacent bonds in the machine direction) in a range from 0.5 mm to 20 mm (in some embodiments, in a range from 0.5 mm to 10 mm), although other sizes are also useful.

In some embodiments, a polymeric layer described herein is stretched to achieve a desired thickness. The polymeric layers may be stretched in the cross direction only to achieve openings that are extended in the cross direction, or stretched only in the machine direction to achieve openings that are extended in the machine direction, or stretched in both the cross and machine direction to achieve relatively round openings. Stretching can provide a relatively easy method for yielding relatively low basis weight polymeric layers. In addition, the opening size can be reduced after stretching by calendaring a polymeric layer.

In some embodiments, netting for making polymeric layers described herein are elastic. In some embodiments, the polymeric strands of netting for making polymeric layers have a machine direction and a cross-machine direction, wherein the netting or arrays of polymeric strands is elastic in machine direction, and inelastic in the cross-machine direction. In some embodiments, the polymeric strands of netting for making polymeric layers have a machine direction and a cross-machine direction, wherein the netting or arrays of polymeric strands is inelastic in machine direction, and elastic in the cross-machine direction. Elastic means that the material will substantially resume its original shape after being stretched (i.e., will sustain only small permanent set following deformation and relaxation which set is less than 50 percent (in some embodiments, less than 25, 20, 15, or even less than 10 percent) of the original length at moderate elongation (i.e., about 400-500%; in some embodiments, up to 300% to 1200%, or even up to 600% to 800%) elongation at room temperature). The elastic material can be both pure elastomers and blends with an elastomeric phase or content that will still exhibit substantial elastomeric properties at room temperature.

It is within the scope of the instant disclosure to use heat-shrinkable and non-heat shrinkable elastics. Non-heat shrinkable means that the elastomer, when stretched, will substantially recover sustaining only a small permanent set as discussed above at room temperature (i.e., about 25° C.).

In some embodiments of netting for making polymeric layers described herein, the array of polymeric strands exhibits at least one of diamond-shaped, triangular-shaped, or hexagonal-shaped openings.

In some embodiments, the polymeric strands of netting for making polymeric layers described herein have an average width in a range from 10 micrometers to 500 micrometers ((in some embodiments, in a range from 10 micrometers to 400 micrometers, or even 10 micrometers to 250 micrometers), although other sizes are also useful.

In some embodiments, the strands of netting for making polymeric layers described herein (i.e., the first strands, second strands, and bond regions, and other optional strands, each have thicknesses that are substantially the same.

In some embodiments, polymeric layers described herein for at least a majority of the openings, the area of each opening is not greater than 5 (in some embodiments, not greater than 2.5, 2, 1, 0.5, 0.1, 0.05, 0.01, 0.075, or even not greater than 0.005) mm², although other sizes are also useful.

In some embodiments, polymeric layers described herein at least some of the openings have at least two pointed ends. In some embodiments, polymeric layers described herein at least some of the openings are elongated with at least two pointed ends. In some embodiments, polymeric layers described herein at least some of the openings are elongated with two opposed pointed ends. In some embodiments, polymeric layers described herein at least some of the openings are oval.

Some embodiments, polymeric layers described herein have in a range from 50,000 to 6,000,000 (in some embodiments, 100,000 to 6,000,000, 500,000 to, 6,000,000, or even 1,000,000 to 6,000,000) openings/m², although other sizes are also useful.

In some embodiments, polymeric layers described herein the openings have a length and a width, and a ratio of lengths to widths in a range from 2:1 to 100:1 (in some embodiments, 2:1 to 75:1, 2:1 to 50:1, 2:1 to 25:1, or even, 2:1 to 10:1), although other ratios sizes are also useful. In some embodiments, polymeric layer described herein the openings have a length and a width, and a ratio of lengths to widths in a range from 1:1 to 1.9:1, although other ratios are also useful. In some embodiments, polymeric layer described herein the openings have widths in a range from 5 micrometers to 1 mm (in some embodiments, 10 micrometers to 0.5 mm), although other sizes are also useful. In some embodiments, polymeric layer described herein the openings have lengths in a range from 100 micrometers to 10 mm (in some embodiments, 100 micrometers to 1 mm), although other sizes are also useful.

Some embodiments of polymeric layers described herein have a thickness up to 2 mm (in some embodiments, up to 1 mm, 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers, although thicknesses outside of these sizes are also useful Some embodiments of polymeric layers described herein are sheets having an average thickness in a range from 250 micrometers to 5 mm, although thicknesses outside of these sizes are also useful. Some embodiments of polymeric layers described herein have an average thickness not greater than 5 mm, although thicknesses outside of these sizes are also useful.

Some embodiments of polymeric layers described herein have a basis weight in a range from 25 g/m² to 600 g/m² (in some embodiments, 50 g/m² to 250 g/m²), although basis weights outside of these sizes are also useful.

Figure 20:
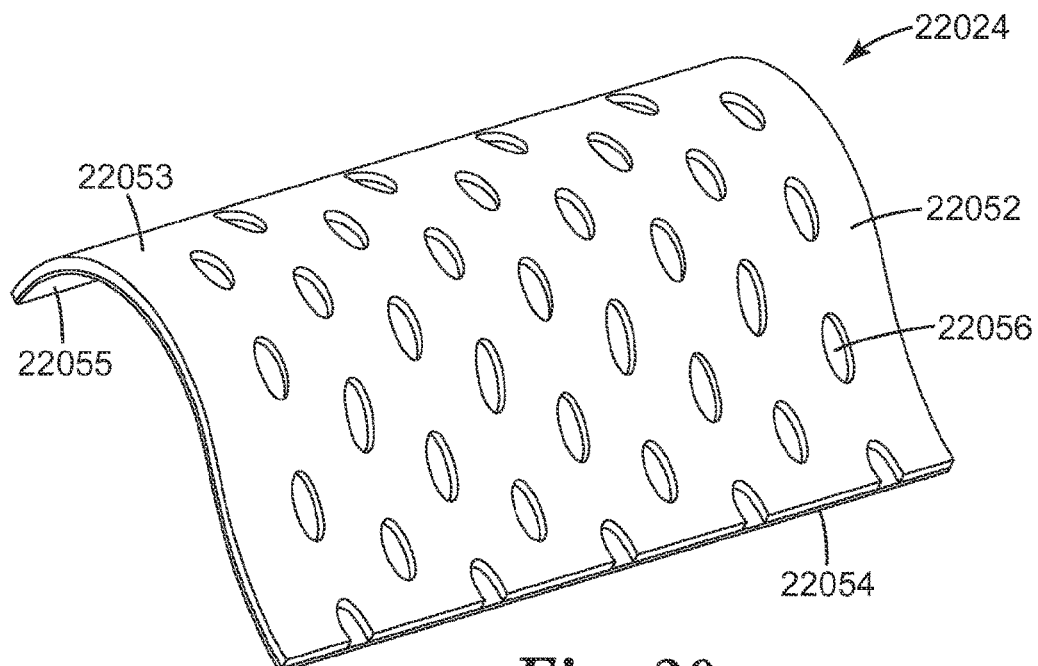
FIG. 20 is a perspective view of a polymeric layer formed from two-material strands, sized and nipped so as to close the openings within one, but not both, of the materials.

Referring now to FIG. 20, a perspective view of polymeric layer 22024 has been formed from two-material strands, sized and nipped so the openings 22056 are retained only through first material 22053 from first major surface 22052 to second material 22055 and not through to second major surface 22054. Depending on the choice of first material 22053 and second material 22055, diverse flexible net-like structured tapes can be prepared. For example, if first material 22053 is very flexible while second material 22055 is a microporous adhesive, such a structured tape could be, for example a very conformable but breathable patch for holding pressure infusion sets immobile against the skin in a hospital setting.

Figure 21:
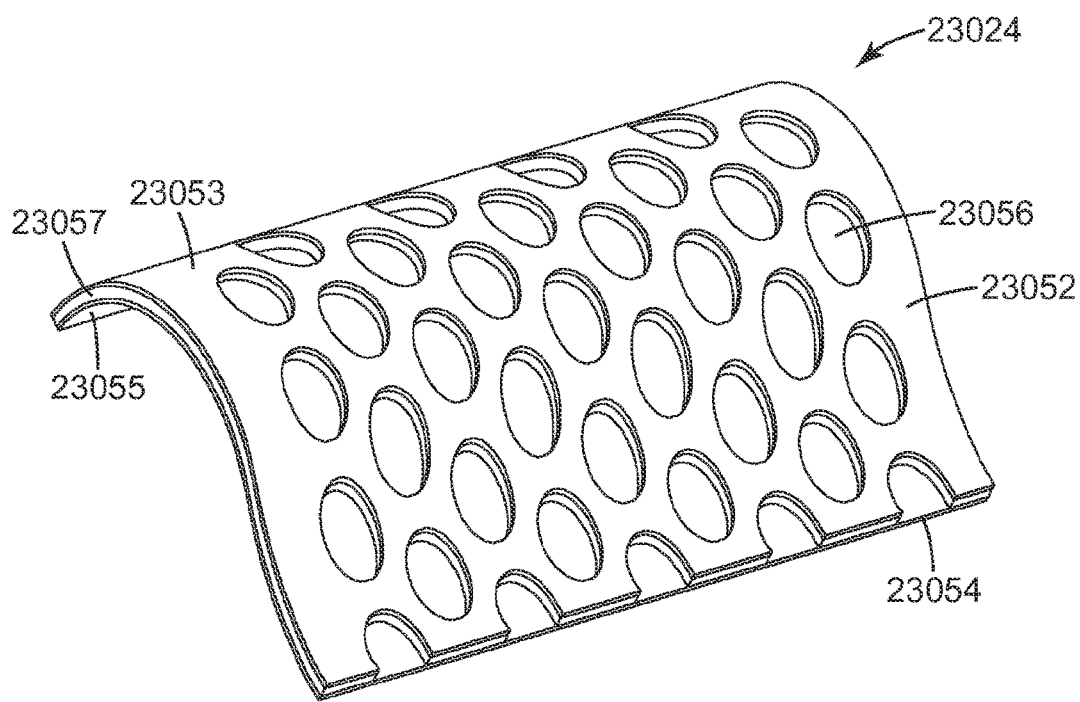
FIG. 21 is a perspective view of a polymeric layer formed from three-material strands, sized and nipped so as to close the openings within at least one, but not all, of the materials.

FIG. 21 is a perspective view of a polymeric layer 23024 formed from three-material strands, sized and nipped so as to close the openings within at least one, but not all, of the materials. In the depicted embodiment, the openings 23056 are retained only within first material 23053 and core material 23057. Thus there is no through hole from the first major surface 23052 to the second major surface 23054. Depending on the choice of the first material 23053, second material 23055, and third material 23057, diverse flexible net-like structured tapes can be prepared.

Some embodiments of polymeric layers described herein are also useful, for example, for breathable (i.e., a moisture vapor transmission rate (MVTR) value of at least 500 g/m²/day as measured using ASTM E 96 (1980) at 40° C. The use of this test in connection with web material is discussed in U.S. Pat. No. 5,614,310 (Delgado et al.), the disclosures of which are incorporated herein by reference. When wrapping a limb with a compression wrap, it is typical to apply the wrap so that one course partially overlaps the previous course. Therefore, it is convenient for compression wraps to have a first major surface that has some tendency to self adhere to a second major surface of the wrap. Typically therapeutic regimens performed with compression wraps apply a force in a range from about 14 to about 35 mm Hg to the wrapped portion of the patient's body (see, e.g., the discussion at, "Compression Bandaging in the Treatment of Venous Leg Ulcers;" S. Thomas; World Wide Wounds, September 1997). It is therefore convenient for a compression wrap to have some extensibility so that minor changes in the diameter of the patient's limbs will not drastically change the compression force against the skin from the target pressure prescribed for the patient's indication. The compression wrap force can be measured as described in "Is Compression Bandaging Accurate? The Routine Use of Interface Pressure Measurements in Compression Bandaging of Venous Leg Ulcers;" A. Satpathy, S. Hayes and S. Dodds; *Phlebology* 2006 21: 36, the disclosure of which is incorporated herein by reference. In some embodiments, polymeric layers described herein are convenient for use as compression wrap, for example, have openings in each of the first and second major surfaces that comprise in a range from 10 to 75 percent of their respective surface areas.

In some embodiments, polymeric layers described herein exhibit a tensile force per inch (2.54 cm) of width at 28% elongation of less than 7.78 N (1.75 lbf) as determined by the Stretching Test below. In some embodiments, the tensile force per inch of with at 28% elongation ranges from 6.89 N (1.55 lbf) to 0.44 N (0.1 lbf), or even 5.78 N (1.3 lbf) to 1.1 N (0.25 lbf). The Stretching Test is conducted as follows: A tensile strength tester (available under the trade designation "INSTRON 5500R"; Model 1122 from Instron, Norwood, Mass.) with a 22.68 Kg (50 lb) load cell is used to measure the force required to stretch the polymeric layer to 200% elongation. Force (lbf) and tensile strain (%) are measured every 0.1 second (100 ms). A 15.24 cm (6 inch) long (in the machine direction) by 7.62 cm (3 inch) wide sample of polymeric layer is clamped between 7.62 cm (3 inch) wide grips. The initial gap length is 10.16 cm (4 inch). The rate of crosshead separation is 0.127 m/min (5 in/min.). An average of 5 replicates are tested to determine the average value.

In some embodiments, polymeric layers described herein exhibits preferable hand tearable characteristics in the cross-web direction. For example, some embodiments of polymeric layers described herein have a crossweb load at break less than 26.7 N (6 lbf) (in some embodiments in a range from 20.0 N (4.5 lbf) to 2.22 N (0.5 lbf) as determined by the Cross Web Strength Test. The Cross Web Strength Test is conducted as follows: A 2.54 cm (1 inch) wide strip of the polymeric layer (cut across the web) is loaded into a tensile strength tester ("INSTRON 5500R"; Model 1122) with a 22.68 Kg (50 lb) load cell. The load and tensile strain (%) at break for each sample is recorded where the initial gap is 5.08 cm (2 inch) with a crosshead separation rate of 1.27 m/min. (50 in/min.). An average of 10 replicates are tested to determine the average value.

The cross web strength and tearability of embodiments of polymeric layers described herein can be adjusted, for example, by adjusting the extrusion temperature (e.g., until microscopic surface melt fracture is present or not), adjusting the speed of the take away chill roll speed, by extruding netting used to make polymeric layers described herein through shorter (decreased height) orifice holes, by adjusting the straight-to-oscillating strand area ratios (height by width of orifice holes), and by adjusting the oscillation strand relative to the straight strand extruder rates.

Exemplary Embodiments

1A. A polymeric layer having first and second, generally opposed major surfaces, comprising an array of blind openings extending into the first major surface, but not through the second major surfaces, wherein the blind openings each have a series of areas through the blind openings from the first major surface towards the second major surfaces ranging from minimum to maximum areas, wherein for at least a majority of the blind openings the minimum area is not at the first major surface, wherein at least a portion of the first major surface comprises a first material and extends up to, but not into the second major surface, and wherein at least a portion of the second major surface comprises a second, different material.

2A. The polymeric layer of Exemplary Embodiment 1A, wherein the first material is an adhesive.

3A. The polymeric layer of Exemplary Embodiment 1A, wherein the first material is a pressure sensitive adhesive.

4A. The polymeric layer of either Exemplary Embodiment 2A or 3A, wherein the second material is an adhesive.

5A. The polymeric layer of either Exemplary Embodiment 2A or 3A, wherein the first material is a pressure sensitive adhesive.

6A. The polymeric layer of any preceding Exemplary Embodiment A, wherein at least a portion of the first major surface comprises a third material different than the first material.

7A. The polymeric layer of Exemplary Embodiment 6A, wherein the third material is an adhesive.

8A. The polymeric layer of Exemplary Embodiment 6A, wherein the third material is a pressure sensitive adhesive.

9A. The polymeric layer of any of Exemplary Embodiments 1A to 5A, wherein at least a portion of the first major surface comprises a third material different than the first material, and wherein at least a portion of the second major surface comprises a fourth material different than the second and third materials.

10A. The polymeric layer of any of Exemplary Embodiments 1A to 5A, wherein at least a portion of the first major surface comprises a third material different than the first material, and wherein at least a portion of the second major surface comprises a fourth material different than the second material.

11A. The polymeric layer of any of Exemplary Embodiments 1A to 5A, wherein at least a portion of the first major surface comprises a third material different than the first material, and wherein at least a portion of the second major surface comprises a fourth material different than the second and third materials.

12A. The polymeric layer of any of Exemplary Embodiments 1A to 5A, wherein at least a portion of the second major surface comprises a material that is the same as the first material.

13A. The polymeric layer of any preceding Exemplary Embodiment A, wherein the total open area for the first major surface is not greater than 50 (in some embodiments, not greater than 45, 40, 35, 30, 25, 20, 15, 10, 5, 4, 3, 2, 1, 0.75, 0.5, 0.25, or even not greater than 0.1; in some embodiments, in a range from 0.1 to not greater than 50, 0.1 to not greater than 45, 0.1 to not greater than 40, 0.1 to not greater than 35, 0.1 to not greater than 30, 0.1 to not greater than 25, 0.1 to not greater than 20, 0.1 to not greater than 15, 0.1 to not greater than 10, or even 0.1 to not greater than 5) percent of the total area of the first major surface.

14A. The polymeric layer of any preceding Exemplary Embodiment A, wherein for at least a majority of the blind openings, the area of each opening is not greater than 5 (in some embodiments, not greater than 2.5, 2, 1, 0.5, 0.1, 0.05, 0.01, 0.075, or even not greater than 0.005) mm².

15A. The polymeric layer of any preceding Exemplary Embodiment A, wherein at least some of the blind openings have at least two pointed ends.

16A. The polymeric layer of any of Exemplary Embodiments 1A to 14A, wherein at least some of the blind openings are elongated with at least two pointed ends.

17A. The polymeric layer of any of Exemplary Embodiments 1A to 14A, wherein at least some of the blind openings are elongated with two opposed pointed ends.

18A. The polymeric layer of any of Exemplary Embodiments 1A to 14A, wherein at least some of the blind openings are oval.

19A. The polymeric layer of any preceding Exemplary Embodiment A having in a range from 50,000 to 6,000,000 (in some embodiments, 100,000 to 6,000,000, 500,000 to, 6,000,000, or even 1,000,000 to 6,000,000) openings/m².

20A. The polymeric layer of any preceding Exemplary Embodiment A, wherein the blind openings have a length and a width, and a ratio of lengths to widths in a range from 2:1 to 100:1 (in some embodiments, 2:1 to 75:1, 2:1 to 50:1, 2:1 to 25:1, or even, 2:1 to 10:1).

21A. The polymeric layer of any of Exemplary Embodiments 1A to 19A, wherein the blind openings have a length and a width, and a ratio of lengths to widths in a range from 1:1 to 1.9:1.

22A. The polymeric layer of any preceding Exemplary Embodiment A, wherein the blind openings have widths in a range from 5 micrometers to 1 mm (in some embodiments, 10 micrometers to 0.5 mm).

23A. The polymeric layer of any preceding Exemplary Embodiment A, wherein the blind openings have lengths in a range from 100 micrometers to 10 mm (in some embodiments, 100 micrometers to 1 mm).

24A. The polymeric layer of any preceding Exemplary Embodiment A, wherein the layer has a thickness up to 2 mm (in some embodiments, up to 1 mm, 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

25A. The polymeric layer of any of Exemplary Embodiments 1A to 23A, wherein the polymeric layer is a sheet having an average thickness in a range from 250 micrometers to 5 mm.

26A. The polymeric layer of any of Exemplary Embodiments 1A to 23A, wherein the polymeric layer is a film having an average thickness not greater than 5 mm.

27A. The polymeric layer of any preceding Exemplary Embodiment A having a basis weight in a range from 25 g/m² to 600 g/m² (in some embodiments, 50 g/m² to 250 g/m²).

28A. The polymeric layer of any preceding Exemplary Embodiment A comprising at least one of a dye or pigment therein.

29A. The polymeric layer of any preceding Exemplary Embodiment A having a crossweb load at break less than 26.7 N (6 lbf) (in some embodiments in a range from 20.0 N (4.5 lbf) to 2.22 N (0.5 lbf) as determined by the Cross Web Strength Test.

30A. A breathable compression wrap comprising the polymeric layer of any preceding Exemplary Embodiment A, wherein the polymeric layer has first and second generally opposed major surfaces, and wherein the first major surface has an affinity for the second major surface.

31A. The breathable compression wrap of Exemplary Embodiment 30A exhibits a tensile force per inch (2.54 cm) of width at 28% elongation of less than 7.78 N (1.75 lbf) (in some embodiments, in a range from 6.89 N (1.55 lbf) to 0.44 N (0.1 lbf), or even 5.78 N (1.3 lbf) to 1.1 N (0.25 lbf)) as determined by the Stretching Test.

32A. The breathable compression wrap of either Exemplary Embodiment 30A or 31A, wherein in a range from 10 to 75 percent of each of the first and second major surfaces comprise said openings.

1B. A method of making a polymeric layer of any preceding Exemplary Embodiment A, the method comprising at least one of passing through a nip or calendaring netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands.

2B. The method of Exemplary Embodiment 1B, wherein the third material of the netting does not extend to the second major surface of the second plurality of strands of the netting.

3B. The method of either Exemplary Embodiment 1B or 2B, wherein the first and third materials of the netting are the same.

4B. The method of either Exemplary Embodiment 1B or 2B, wherein the first, third, and fourth materials of the netting are the same.

5B. The method of either Exemplary Embodiment 1B or 2B, wherein the first and fourth materials of the netting are the same.

6B. The method of either Exemplary Embodiment 1B or 2B, wherein the first, second, third, and fourth materials of the netting are different from each other.

7B. The method of either Exemplary Embodiment 1B or 2B, wherein the first and third materials of the netting are the same, and wherein the fourth is different than the first, second, and third materials of the netting.

8B. The method of either Exemplary Embodiment 1B or 2B, wherein the first and fourth materials of the netting are the same, wherein the first and second materials are different than the third material of the netting.

9B. The method of either Exemplary Embodiment 1B or 2B, wherein the first and third materials of the netting are the same, and wherein the second and fourth materials of the netting are the same.

10B. The method of either Exemplary Embodiment 1B or 2B, wherein the first and fourth materials of the netting are the same, and wherein the second and third materials of the netting are the same.

11B. The method of any preceding Exemplary Embodiment B, wherein at least one of the first, second, third, or fourth materials of the netting comprises an adhesive.

12B. The method of any of Exemplary Embodiments 1B to 10B, wherein at least two of the first, second, third, or fourth materials of the netting comprises an adhesive.

13B. The method of any of Exemplary Embodiments 1B to 10B, wherein at least three of the first, second, third, or fourth materials of the netting comprises an adhesive.

14B. The method of any of Exemplary Embodiments 1B to 10B, wherein each of the first, second, third, or fourth materials of the netting comprises an adhesive.

15B. The method of any of Exemplary Embodiments 1B to 10B, wherein at least one of the first, second, third, or fourth materials of the netting comprises a pressure sensitive adhesive.

16B. The method of any of Exemplary Embodiments 1B to 10B, wherein at least two of the first, second, third, or fourth materials of the netting comprises a pressure sensitive adhesive.

17B. The method of any of Exemplary Embodiments 1B to 10B, wherein at least three of the first, second, third, or fourth materials of the netting comprises a pressure sensitive adhesive.

18B. The method of any of Exemplary Embodiments 1B to 10B, wherein each of the first, second, third, or fourth materials of the netting comprises a pressure sensitive adhesive.

19B. The method of any preceding method Exemplary Embodiment B, wherein the netting has a thickness in a range from 2 micrometers to 750 micrometers (in some embodiments, in a range from 5 micrometers to 500 micrometers, or even 25 micrometers to 250 micrometers).

20B. The method of any preceding Exemplary Embodiment B further comprising a fifth, different material of the netting between the first and second materials of the netting.

21B. The method of any preceding Exemplary Embodiment B further comprising a sixth, different material of the netting between the third and fourth materials of the netting.

22B. The method of any preceding Exemplary Embodiment B, wherein the polymeric strands of the netting do not substantially cross over each other (i.e., at least 50 (at least 55, 60, 65, 70, 75, 80, 85, 90, 95, 99, or even 100) percent by number).

23B. The method of any preceding Exemplary Embodiment B, wherein the netting has a basis weight in a range from 5 g/m$^2$ to 600 g/m$^2$ (in some embodiments, 10 g/m$^2$ to 600 g/m$^2$, 10 g/m$^2$ to 400 g/m$^2$, or even 400 g/m$^2$ to 600 g/m$^2$).

24B. The method of any preceding Exemplary Embodiment B, wherein the netting has a strand pitch (i.e., center point-to-center point of adjacent bonds in the machine direction) in a range from 0.5 mm to 20 mm (in some embodiments, in a range from 0.5 mm to 10 mm).

25B. The method of any preceding Exemplary Embodiment B, wherein the netting is elastic.

26B. The method of any preceding Exemplary Embodiment B, wherein the netting has a machine direction and a cross-machine direction, and wherein the netting is elastic in machine direction, and inelastic in the cross-machine direction.

27B. The method of any of Exemplary Embodiments 1B to 25B, wherein the netting has a machine direction and a cross-machine direction, and wherein the netting is inelastic in the machine direction, and elastic in the cross-machine direction.

28B. The method of any preceding Exemplary Embodiment B, wherein the array of polymeric strands of the netting exhibits at least one of diamond-shaped, triangular-shaped, or hexagonal-shaped blind openings.

29B. The method of any preceding Exemplary Embodiment B, wherein at least some of the polymeric strands of the netting comprise a first polymer that is a thermoplastic (e.g., adhesives, nylons, polyesters, polyolefins, polyurethanes, elastomers (e.g., styrenic block copolymers), and blends thereof).

30B. The method of any preceding Exemplary Embodiment B, wherein the first strands of the netting have an average width in a range from 10 micrometers to 500 micrometers (in some embodiments, in a range from 10 micrometers to 400 micrometers, or even 10 micrometers to 250 micrometers).

31B. The method of any preceding Exemplary Embodiment B, wherein the second strands of the netting have an average width in a range from 10 micrometers to 500 micrometers ((in some embodiments, in a range from 10 micrometers to 400 micrometers, or even 10 micrometers to 250 micrometers).

32B. The method of any preceding Exemplary Embodiment B where the netting is stretched.

33B. The method of any preceding Exemplary Embodiment B, wherein the bond regions of the netting have an average largest dimension perpendicular to the strand thickness, wherein the polymeric strands have an average width, and wherein the average largest dimension of the bond regions of the netting is at least 2 (in some embodiments, at least 2.5, 3, 3.5, or even at least 4) times greater than the average width of the polymeric strands.

1C. A method of making a polymeric layer of any preceding Exemplary Embodiment A, the method comprising at least one of passing through a nip or calendaring a netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein there is a fifth material disposed between the first and second materials, wherein there is a sixth material disposed between the third and fourth materials, wherein the first and fifth materials are different, wherein the first, second, third, and fourth are the same, and wherein the first material does not extend to the second major surface of the first plurality of strands.

2C. The method of Exemplary Embodiment 1C, wherein the third material of the netting does not extend to the second major surface of the second plurality of strands of the netting.

3C. The method of either Exemplary Embodiment 1C or 2C, wherein the first and sixth materials of the netting are the same.

4C. The method of either Exemplary Embodiment 1C or 2C, wherein the fifth and sixth materials of the netting are the same.

5C. The method of any preceding Exemplary Embodiment C, wherein at least one of the first, second, third, or fourth materials of the netting comprises an adhesive.

6C. The method of any of Exemplary Embodiments 1C to 4C, wherein at least two of the first, second, third, or fourth materials of the netting comprises an adhesive.

7C. The method of any of Exemplary Embodiments 1C to 4C, wherein at least three of the first, second, third, or fourth materials of the netting comprises an adhesive.

8C. The method of any of Exemplary Embodiments 1C to 4C, wherein each of the first, second, third, or fourth materials of the netting comprises an adhesive.

9C. The method of any of Exemplary Embodiments 1C to 4C, wherein at least one of the first, second, third, or fourth materials of the netting comprises a pressure sensitive adhesive.

10C. The method of any of Exemplary Embodiments 1C to 4C, wherein at least two of the first, second, third, or fourth materials of the netting comprises a pressure sensitive adhesive.

11C. The method of any of Exemplary Embodiments 1C to 4C, wherein at least three of the first, second, third, or fourth materials of the netting comprises a pressure sensitive adhesive.

12C. The method of any of Exemplary Embodiments 1C to 4C, wherein each of the first, second, third, or fourth materials of the netting comprises a pressure sensitive adhesive.

13C. The method of any preceding Exemplary Embodiment C, wherein the netting has a thickness in a range from 2 micrometers to 750 micrometers (in some embodiments, in a range from 5 micrometers to 500 micrometers, or even 25 micrometers to 250 micrometers).

14C. The method of any preceding Exemplary Embodiment C, wherein the polymeric strands of the netting do not substantially cross over each other (i.e., at least 50 (at least 55, 60, 65, 70, 75, 80, 85, 90, 95, 99, or even 100) percent by number).

15C. The method of any preceding Exemplary Embodiment C, wherein the netting has a basis weight in a range from 5 g/m² to 600 g/m² (in some embodiments, 10 g/m² to 600 g/m², 10 g/m² to 400 g/m², or even 400 g/m² to 600 g/m²).

16C. The method of any preceding Exemplary Embodiment C, wherein the netting has a basis weight in a range from 0.5 g/m² to 40 g/m² (in some embodiments, 1 g/m² to 20 g/m²).

17C. The method of any preceding Exemplary Embodiment C, wherein the netting has a strand pitch (i.e., center point-to-center point of adjacent bonds in the machine direction) in a range from 0.5 mm to 20 mm (in some embodiments, in a range from 0.5 mm to 10 mm).

18C. The method of any preceding Exemplary Embodiment C, wherein the netting is elastic.

19C. The method of any preceding Exemplary Embodiment C, wherein the netting has a machine direction and a cross-machine direction, and wherein the netting is elastic in the machine direction, and inelastic in the cross-machine direction.

20C. The method of any of Exemplary Embodiments 1C to 18C, wherein the netting has a machine direction and a cross-machine direction, and wherein the netting is inelastic in the machine direction, and elastic in the cross-machine direction.

21C. The method of any preceding Exemplary Embodiment C, wherein the array of polymeric strands of the netting exhibits at least one of diamond-shaped, triangular-shaped, or hexagonal-shaped blind openings.

22C. The method of any preceding Exemplary Embodiment C, wherein at least some of the polymeric strands of the netting comprise a first polymer that is a thermoplastic (e.g., adhesives, nylons, polyesters, polyolefins, polyurethanes, elastomers (e.g., styrenic block copolymers), and blends thereof).

23C. The method of any preceding Exemplary Embodiment C, wherein the first strands of the netting have an average width in a range from 10 micrometers to 500 micrometers ((in some embodiments, in a range from 10 micrometers to 400 micrometers, or even 10 micrometers to 250 micrometers).

24C. The method of any preceding Exemplary Embodiment C, wherein the second strands of the netting have an average width in a range from 10 micrometers to 500 micrometers (in some embodiments, in a range from 10 micrometers to 400 micrometers, or even 10 micrometers to 250 micrometers).

25C. The method of any preceding Exemplary Embodiment C where the netting is stretched.

26C. The method of any preceding Exemplary Embodiment C, wherein the bond regions of the netting have an average largest dimension perpendicular to the strand thickness, wherein the polymeric strands have an average width, and wherein the average largest dimension of the bond regions of the netting is at least 2 (in some embodiments, at least 2.5, 3, 3.5, or even at least 4) times greater than the average width of the polymeric strands.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

A co-extrusion die as generally depicted in FIG. 14 and assembled with a multi shim repeating pattern of extrusion orifices as generally illustrated in FIG. 18, was prepared. The thickness of the shims in the repeat sequence was 4 mils (0.102 mm). These shims were formed from stainless steel, with perforations cut by a wire electron discharge machining. The height of dispensing orifices were 15 mils (0.38 mm) for the first orifice and 30 mils (0.765 mm) for the second orifice. The extrusion orifices were aligned in a collinear, alternating arrangement, and resulting dispensing surface was as shown in FIG. 18A. The total width of the shim setup was 15 cm.

The inlet fittings on the two end blocks were each connected to three conventional single-screw extruders. The extruder feeding the cavities 1562a and 1562b were loaded with polyolefin elastomer (obtained under the trade designation "8401 Engage" from Dow, Midland Mich.) dry blended with 3% red color concentrate, (obtained under the trade designation "RED POLYPROPYLENE PIGMENT" from Clariant, Minneapolis, Minn.). The extruder feeding the cavities 1562c and 1562d were loaded with loaded with acrylate copolymer adhesive (obtained under the trade designation "93/7" from 3M Company, St. Paul, Minn.). Valves were used to balance the flow of this single feedstream to both cavities.

The melt was extruded vertically into an extrusion quench takeaway nip. The quench nip was a smooth temperature controlled chrome plated 20 cm diameter steel roll and an 11 cm diameter silicone rubber roll. The rubber roll was about 60 durometer. Both were temperature controlled with internal water flow. The nip pressure was generated with two pressurized air cylinders. Release liner was wrapped around rolls which are in contact with the adhesive side of the web. The web path wrapped 180 degrees around the chrome steel roll and then to a windup roll. A schematic of the quench process is shown in FIG. 1. Under these conditions a polymeric layer generally as depicted in FIG. 20 with through opening from the first major surface to the second major surface was produced.

Other process conditions are listed below:

| | |
|---|---|
| Orifice width for the first orifice: | 0.204 mm |
| Orifice height for the first orifice: | 0.38 mm |
| Orifice width of the second orifice: | 0.408 mm |
| Orifice height of the second orifice: | 0.765 mm |
| Land spacing between orifices | 0.306 mm |
| Flow rate of first polymer (first orifice side 1) | 1.4 kg/hr. |
| Flow rate of second polymer (second orifice side 1) | 0.5 kg/hr. |
| Flow rate of third polymer (first and second orifice side 2) | 1.4 kg/hr |
| Extrusion temperature | 218° C. |
| Quench roll temperature | 15° C. |
| Quench takeaway speed | 3 m/min. |
| Melt drop distance | 2 cm |
| Nip Pressure | 1 kg/cm |

Using an optical microscope, the dimensions of the resulting polymeric layer having an array of openings between the major surfaces were measured, and are listed below.

| | |
|---|---|
| Thickness | 0.17 mm |
| Basis weight | 175 g/m$^2$ |
| Hole general shape | vesica piscis |
| Hole diameter cross direction | 0.09 mm |
| Hole diameter machine direction | 1.2 mm |
| Holes/cm$^2$ | 45 |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of making a polymeric layer having first and second, generally opposed major surfaces, comprising an array of blind openings extending into the first major surface, but not through the second major surfaces, wherein the blind openings each have a series of areas through the blind openings from the first major surface towards the second major surfaces ranging from minimum to maximum areas, wherein for at least a majority of the blind openings the minimum area is not at the first major surface, wherein at least a portion of the first major surface comprises a first material and the first material extends up to, but not into the second major surface and is not present on the second major surface, and wherein at least a portion of the second major surface comprises a second, different material, the method comprising at least one of passing through a nip or a calendaring netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises the first material, wherein the second major surface of the first plurality of strands comprises the second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands.

2. The method of claim 1, wherein at least one of the first, second, third, or fourth materials of the netting comprises an adhesive.

3. The method of claim 1, wherein the netting has a basis weight in a range from 5 g/m$^2$ to 600 g/m$^2$.

4. The method of claim 1 where the netting is stretched.

5. A method of making a polymeric layer having first and second, generally opposed major surfaces, comprising an array of blind openings extending into the first major surface, but not through the second major surfaces, wherein the blind openings each have a series of areas through the blind openings from the first major surface towards the second major surfaces ranging from minimum to maximum areas, wherein for at least a majority of the blind openings the minimum area is not at the first major surface, wherein at least a portion of the first major surface comprises a first material and the first material extends up to, but not into the second major surface and is not present on the second major surface, and wherein at least a portion of the second major surface comprises a second, different material, the method comprising at least one of passing through a nip or a calendaring a netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises the first material, wherein the second major surface of the first plurality of strands comprises the second material, wherein the first major surface of the second plurality of strands comprises a third material, wherein the second major surface of the second plurality of strands comprises a fourth material, wherein there is a fifth material disposed between the first and second materials, wherein there is a sixth material disposed between the third and fourth materials, wherein the first and fifth materials are different, wherein the first, second, third, and fourth are the same, and wherein the first material does not extend to the second major surface of the first plurality of strands.

* * * * *

UNITED STATES PATENT AND TRADEMARK OFFICE
CERTIFICATE OF CORRECTION

PATENT NO.        : 10,099,408 B2
APPLICATION NO.   : 14/900343
DATED             : October 16, 2018
INVENTOR(S)       : Ronald Ausen Page 1 of 1

It is certified that error appears in the above-identified patent and that said Letters Patent is hereby corrected as shown below:

In the Specification

Column 12
Line 37, delete "illustrated" and insert -- illustrated. --, therefor.
Line 66, delete "illustrated" and insert -- illustrated. --, therefor.

Column 13
Line 25, delete "illustrated" and insert -- illustrated. --, therefor.
Line 47, delete "illustrated" and insert -- illustrated. --, therefor.
Line 62, delete "illustrated" and insert -- illustrated. --, therefor.

Column 14
Line 2, delete "362d" and insert -- 362d. --, therefor.
Line 30, delete "illustrated" and insert -- illustrated. --, therefor.
Line 37, delete "362d" and insert -- 362d. --, therefor.
Line 65, delete "illustrated" and insert -- illustrated. --, therefor.

Column 16
Line 16, delete "illustrated" and insert -- illustrated. --, therefor.

Signed and Sealed this
Twenty-fifth Day of December, 2018

Andrei Iancu
*Director of the United States Patent and Trademark Office*